(12) United States Patent
Endo et al.

(10) Patent No.: US 12,384,366 B2
(45) Date of Patent: Aug. 12, 2025

(54) DRIVING ASSISTANCE APPARATUS, DRIVING ASSISTANCE METHOD, AND PROGRAM

(71) Applicant: TOYOTA JIDOSHA KABUSHIKI KAISHA, Toyota (JP)

(72) Inventors: Kota Endo, Susono (JP); Yuta Ikezawa, Susono (JP); Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 17/952,915

(22) Filed: Sep. 26, 2022

(65) Prior Publication Data
US 2023/0110942 A1 Apr. 13, 2023

(30) Foreign Application Priority Data
Sep. 28, 2021 (JP) ................................ 2021-157698

(51) Int. Cl.
*B60W 30/14* (2006.01)
*B60W 30/02* (2012.01)
(Continued)

(52) U.S. Cl.
CPC ........ *B60W 30/146* (2013.01); *B60W 30/025* (2013.01); *B60W 30/18159* (2020.02);
(Continued)

(58) Field of Classification Search
CPC ............. B60W 30/146; B60W 30/025; B60W 30/18159; B60W 40/04; B60W 50/0097;
(Continued)

(56) References Cited

U.S. PATENT DOCUMENTS 6,725,145 B1 * 4/2004 Takahashi .......... B60K 31/0075
701/72
8,355,851 B2 1/2013 Inoue et al.
(Continued)

FOREIGN PATENT DOCUMENTS

JP 2012-22565 A 2/2012
JP 2014-41556 A 3/2014
(Continued)

*Primary Examiner* — Anne Marie Antonucci
*Assistant Examiner* — Misa H Nguyen
(74) *Attorney, Agent, or Firm* — Sughrue Mion, PLLC

(57) ABSTRACT

A driving assistance apparatus assists a driver of a vehicle by performing a deceleration control to decelerate the vehicle when the vehicle makes a right turn or a left turn at an intersection. The driving assistance apparatus is configured to make a magnitude of a deceleration of a vehicle while performing a deceleration control of when a left-or-right-turn-condition is not satisfied smaller than a magnitude of a deceleration of the vehicle while performing the deceleration control of when the left-or-right-turn-condition is satisfied, in a case where a distance between the vehicle and the intersection is equal to or shorter than a distance threshold and the vehicle is predicted to change a moving direction to a particular direction, the left-or-right-turn-condition being a condition that is satisfied when the vehicle is permitted to change the moving direction to the particular direction in/from a traveling lane in which the vehicle is running.

8 Claims, 13 Drawing Sheets

(51) Int. Cl.
*B60W 30/18* (2012.01)
*B60W 40/04* (2006.01)
*B60W 50/00* (2006.01)
*G06V 20/58* (2022.01)

(52) U.S. Cl.
CPC ........ *B60W 40/04* (2013.01); *B60W 50/0097* (2013.01); *G06V 20/584* (2022.01); *B60W 2420/403* (2013.01); *B60W 2555/60* (2020.02); *B60W 2556/45* (2020.02)

(58) Field of Classification Search
CPC ....... B60W 2420/403; B60W 2555/60; B60W 2556/45; G06V 20/584
See application file for complete search history.

(56) References Cited

U.S. PATENT DOCUMENTS

| | | | |
|---|---|---|---|
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 2014/0058579 | A1 | 2/2014 | Ono |
| 2015/0210278 | A1* | 7/2015 | Ben Shalom .......... B60K 31/00 382/104 |
| 2019/0295419 | A1 | 9/2019 | Tosa et al. |
| 2020/0001875 | A1 | 1/2020 | Kato et al. |
| 2020/0108826 | A1* | 4/2020 | Kim ................ B60W 30/18159 |

FOREIGN PATENT DOCUMENTS

| | | |
|---|---|---|
| JP | 2019-016000 A | 1/2019 |
| JP | 2019-168960 A | 10/2019 |
| JP | 2020-004333 A | 1/2020 |

* cited by examiner

|  | ROAD SHOULDER DISTANCE Dr | ADJACENT VEHICLE SPEED Vb | ADJACENT VEHICLE ACCELERATION Gb | PRECEDING VEHICLE ACCELERATION Gc | NECESSITY DEGREE α |
|---|---|---|---|---|---|
| SITUATION 1 | Dr≥Drth | Vb≥Vbth | - | - | 0.2 |
| SITUATION 2 | Dr≥Drth | 0 | Gb<0 | - | 0.8 |
| SITUATION 3 | Dr<Drth | - | - | Gc≥0 | 0.2 |

FIG.2

FIRST MODIFICATION

| ROAD SHOULDER DISTANCE Dr | | ADJACENT VEHICLE SPEED Vb | | ADJACENT VEHICLE ACCELERATION Gb | | PRECEDING VEHICLE ACCELERATION Gc | |
|---|---|---|---|---|---|---|---|
| Dr≥Drth | +0.3 | Vb≥Vbth | -0.1 | Gb<0 | +0.5 | Gc≥0 | -0.3 |
| Dr<Drth | +0.5 | Vb=0 | +0.5 | Gb>Gbth | -0.2 | Gc<0 | +0.2 |
| | | Vb<Vbth (Vb≠0) | +0.1 | 0≤Gb≤Gbth | -0.1 | NO PRECEDING VEHICLE | 0 |
| | | NO ADJACENT VEHICLE | 0 | NO ADJACENT VEHICLE | 0 | | |

FIG.10

DRIVING ASSISTANCE APPARATUS, DRIVING ASSISTANCE METHOD, AND PROGRAM

TECHNICAL FIELD

The present disclosure relates to a driving assistance apparatus, driving assistance method, and program, for assisting driving of a driver of a vehicle by performing a decelerating control, which is a form of autonomous driving, to decelerate the vehicle when the vehicle makes a right turn or a left turn at an intersection.

BACKGROUND

There has been a known driving assistance apparatus configured to perform a decelerating control when the vehicle makes a right turn or a left turn at an intersection.

For example, a driving assistance apparatus, (hereinafter, referred to as a "conventional apparatus") disclosed in Japanese Patent Application Laid-Open No. 2020-4333, is configured to determine, based on "an operating state of a turn signal (blinker)" and "road information regarding a traveling lane in which the vehicle is running", whether or not the vehicle is going to (or is about to) make a left turn or a right turn at an intersection. The conventional apparatus is configured to perform the decelerating control when it is determined that the vehicle is going to make a left turn or a right turn at the intersection.

The conventional apparatus does not vary a magnitude of a deceleration in the decelerating control depending on a possibility that the vehicle makes a left turn or a right turn at the intersection. Therefore, if the decelerating control is erroneously performed when the vehicle does not make a left turn or a right turn at the intersection, the vehicle is decelerated at the magnitude of the deceleration that is designed to be appropriate for a case where the vehicle makes a left turn or a right turn at the intersection. A passenger of the vehicle may feel more uneasy as the magnitude of the deceleration is larger, when decelerating control is erroneously performed.

In the meantime, if the magnitude of the deceleration is set at a small value in case the decelerating control is erroneously performed, it is likely that the vehicle cannot be sufficiently decelerated when the decelerating control is properly/appropriately performed.

SUMMARY

The present disclosure has been made to cope with the problems described above.

One of the objectives of the present disclosure is to provide a driving assistance apparatus that is capable of:
increasing a possibility that the uneasiness that the passenger of the vehicle feels when the decelerating control is erroneously performed is mitigated; and
increasing a possibility that the vehicle is sufficiently decelerated when the decelerating control is properly/appropriately performed.

A driving assistance apparatus (hereinafter, referred to as a "present disclosure apparatus") according to the present disclosure is an apparatus (10) for assisting driving of a driver of a vehicle (VA) by performing a deceleration control to decelerate the vehicle when the vehicle makes a right turn or a left turn at an intersection.

The present disclosure apparatus is configured to make a magnitude of a deceleration of the vehicle while performing the deceleration control of when a left-or-right-turn-condition is not satisfied ("No" at step 625, "No" at step 630, "No" at step 635) smaller (step 650, step 710) than a magnitude of a deceleration of the vehicle while performing the deceleration control of when the left-or-right-turn-condition is satisfied ("Yes" at step 635, step 640), in a case where a distance between the vehicle and the intersection is equal to or shorter than a distance threshold and the vehicle is predicted to change a moving direction to a particular direction ("Yes" at step 620), the left-or-right-turn-condition being a condition that is satisfied when the vehicle is permitted to change the moving direction to the particular direction in a traveling lane in which the vehicle is running.

A possibility that the vehicle makes a right turn or a left turn at an intersection when the left-or-right-turn-condition is not satisfied is lower than when the left-or-right-turn-condition is satisfied. In other words, a possibility that the deceleration control is erroneously performed when the left-or-right-turn-condition is not satisfied is higher than a possibility that the deceleration control is erroneously performed when the left-or-right-turn-condition is satisfied. The present disclosure apparatus, when the left-or-right-turn-condition is not satisfied (i.e., when the possibility that the deceleration control is erroneously performed is high), performs the decelerating control that causes the vehicle to decelerate at a deceleration having a magnitude smaller than a magnitude of deceleration in the deceleration control performed when the left-or-right-turn-condition is satisfied (i.e., when the possibility that the deceleration control is erroneously performed is low).

Therefore, the present disclosure apparatus can:
increase a possibility that the uneasiness that the passenger of the vehicle feels when the decelerating control is erroneously performed is mitigated; and
increase a possibility that the vehicle is sufficiently decelerated when the decelerating control is properly/appropriately performed.

In some embodiments, the present disclosure apparatus is configured to:
obtain a necessity degree for performing the deceleration control based on surrounding condition of the vehicle (step 650, step 700 to step 795), when the left-or-right-turn-condition is not satisfied ("No" at step 625, "No" at step 630, "No" at step 635); and
perform the deceleration control in such a manner that the magnitude of the deceleration is smaller as the necessity degree is smaller (step 815).

According to the thus configured present disclosure apparatus, when the left-or-right-turn-condition is not satisfied, the magnitude of the deceleration in the deceleration control can be appropriately determined/realized based on the surrounding condition of the vehicle. Therefore, the above-described possibility that the uneasiness is mitigated can be further increased, and the above-described possibility that the vehicle is sufficiently decelerated can be further increased.

In some embodiments, the present disclosure apparatus is configured to:
have stored necessity degree information (28a, FIG. 2) that defines a relationship between the necessity degree corresponding to a specific situation and at least one surrounding parameter representing the specific situation in advance;
obtain a current surrounding parameter (step 705) when the left-or-right-turn-condition is not satisfied ("No" at step 625, "No" at step 630, "No" at step 635); and obtain the necessity degree by applying the current surrounding parameter to the necessity degree information (step 710).

According to the thus configured present disclosure apparatus, when the left-or-right-turn-condition is not satisfied, the necessity degree is obtained based on the current surrounding parameter, and therefore, the appropriate necessity degree corresponding to the current surrounding condition of the vehicle can be obtained. Accordingly, the above-described possibility that the uneasiness is mitigated can be further increased, and the above-described possibility that the vehicle is sufficiently decelerated can be further increased.

In the thus configured present disclosure apparatus, a high necessity degree situation (situation 2) in which the necessity degree is high and a low necessity degree situation (situation 1, situation 3) in which the necessity degree is low have been recorded in the necessity degree information.

In addition, the thus configured present disclosure apparatus is configured to set the necessity degree to a value between the necessity degree of the high necessity degree situation and the necessity degree of the low necessity degree situation (step 725), when the current surrounding parameter indicates neither the high necessity degree situation nor the low necessity degree situation ("No" at step 715).

The high necessity degree situation and the low necessity degree situation have been stored in the necessity degree information. The current surrounding parameter is applied to the necessity degree information. When the current surrounding parameter indicates either the high necessity degree situation or the low necessity degree situation, the necessity degree corresponding to the situation indicated by the current surrounding parameter is obtained. Whereas, when the current surrounding parameter indicates neither the high necessity degree situation nor the low necessity degree situation, the necessity degree is set to the value between the necessity degree of the high necessity degree situation and the necessity degree of the low necessity degree situation. In this manner, the necessity degree having an appropriate value in accordance with the current surrounding condition of the vehicle is obtained. Therefore, the above-described possibility that the uneasiness is mitigated can be further increased, and the above-described possibility that the vehicle is sufficiently decelerated can be further increased.

The thus configured present disclosure apparatus is configured to obtain, as the necessity degree that determines the magnitude of the deceleration in the deceleration control, the necessity degree of the high necessity degree situation, when
    a road shoulder distance (Dr) is equal to or longer than a predetermined road shoulder distance threshold (Drth) (Dr≥Drth), and
    an adjacent vehicle (VB) running in an adjacent lane (LB) has stopped (Vb=0) or is decelerating (Gb<0).

Here, the road shoulder distance (Dr) is a distance to a particular road shoulder of a road that includes the traveling lane, the particular road shoulder is either a left road shoulder of the road or a right road shoulder of the road, and is located in the side of the particular direction. The adjacent lane (LB) is a lane that is adjacent to the traveling lane in the particular direction.

The thus configured present disclosure apparatus is further configured to obtain, as the necessity degree that determines the magnitude of the deceleration in the deceleration control, the necessity degree of the low necessity degree situation,
    when the road shoulder distance is equal to or longer than the road shoulder distance threshold (Dr≥Drth), and a speed of the adjacent vehicle is equal to or higher than a speed threshold (Vb≥Vbth), or
    when the road shoulder distance is shorter than the road shoulder distance threshold (Dr<Drth), and a preceding vehicle that is traveling ahead of the vehicle is not decelerating (Gc≥0).

When a condition (first condition) that the road shoulder distance is equal to or longer than the road shoulder distance threshold (Drth) (Dr≥Drth) and the adjacent vehicle has stopped (Vb=0) or is decelerating (Gb<0) is satisfied, it is likely that the vehicle changes lanes instead of making a right turn or a left turn. In addition, after the vehicle finishes changing lanes and starts traveling in the adjacent lane, it is likely that the vehicle needs to decelerate because of the adjacent vehicle. In view of this, the necessity degree is set to a relatively large value when the first condition is satisfied.

When a condition (second condition) that the road shoulder distance is equal to or longer than the road shoulder distance threshold, and the speed of the adjacent vehicle is equal to or higher than the speed threshold, it is likely that the vehicle changes lanes instead of making a right turn or a left turn. In addition, after the vehicle finishes changing lanes, it is unlikely that the vehicle needs to decelerate because of the adjacent vehicle. In view of this, the necessity degree is set to a relatively small value when the second condition is satisfied.

When a condition (third condition) that the road shoulder distance is shorter than the road shoulder distance threshold, and a preceding vehicle that is traveling ahead of said vehicle is not decelerating is satisfied, it is likely that the vehicle does not need to decelerate and that the vehicle makes a right turn or a left turn, since the preceding vehicle is not decelerating. In view of this, the necessity degree is set to a relatively small value when the third condition is satisfied.

In this manner, the necessity degree having an appropriate value in accordance with the current surrounding condition of the vehicle is obtained. Therefore, the above-described possibility that the uneasiness is mitigated can be further increased, and the above-described possibility that the vehicle is sufficiently decelerated can be further increased.

In some embodiments, the present disclosure apparatus is configured to:
    have stored individual necessity degree information (FIG. 10) that defines a relationship between an individual condition for each of a plurality of surrounding parameters representing the surrounding condition of the vehicle and an addition-and-subtraction-value for a case where the surrounding parameter satisfies the individual condition, in advance;
    obtain current surrounding parameters (step 705) when the left-or-right-turn-condition is not satisfied ("No" at step 625, "No" at step 630, "No" at step 635);
    obtain the addition-and-subtraction-value by applying the current surrounding parameters to the individual necessity degree information; and
    obtain the necessity degree based on the addition-and-subtraction-value.

According to the thus configured present disclosure apparatus, when the left-or-right-turn-condition is not satisfied, the magnitude of the deceleration in the deceleration control can be appropriately determined/realized based on the surrounding condition of the vehicle. Therefore, the above-described possibility that the uneasiness is mitigated can be further increased, and the above-described possibility that the vehicle is sufficiently decelerated can be further increased.

The thus configured present disclosure apparatus is connected with an administrative server (60) through a network, and is configured to update the necessity degree information based on necessity degree information for update produced by the administrative server, when the necessity degree information for update is received According to the thus configured present disclosure apparatus, since the necessity degree information is updated based on a request of a user of the present disclosure apparatus, the necessity degree that matches with the request of the user can be obtained. Therefore, the above-described possibility that the uneasiness is mitigated can be further increased, and the above-described possibility that the vehicle is sufficiently decelerated can be further increased.

In some embodiments, the present disclosure apparatus is configured to:
include an operating element (25, SW) that is operated by the driver of the vehicle when the driver intends to change the moving direction of the vehicle; and
specify/detect the particular direction to which the vehicle is predicted to change the moving direction, based on an operation of the driver to the operating element.

For example, the operating element may be a turn signal lever or a steering wheel. Since the particular direction to which the vehicle is predicted to change the moving direction is specified based on the operation to such an operating element, the particular direction can be accurately specified.

In some embodiments, the present disclosure apparatus is configured to determine whether or not the left-or-right-turn-condition is satisfied by determining whether or not the vehicle is permitted to change the moving direction to the particular direction in the traveling lane, based on at least one of an image of a traffic light (TL) and an image of an arrow road sign (AM) in the traveling lane, the image of the traffic light and the image of the arrow road sign being included in a camera image which a camera device (22) mounted on the vehicle obtains by taking a picture of an area in front of the vehicle.

According to this configuration, it is possible to determine whether or not the left-or-right-turn-condition is satisfied, accurately.

In the present disclosure, a driving assistance method according to the present disclosure comprises:
a first step (step 650, step 710, step 725) for determining a magnitude of a target deceleration of the vehicle while performing the deceleration control so as to make a magnitude of the target deceleration of the vehicle while performing the deceleration control of when a left-or-right-turn-condition is not satisfied ("No" at step 625, "No" at step 630, "No" at step 635) smaller than a magnitude of the target deceleration of the vehicle while performing the deceleration control of when the left-or-right-turn-condition is satisfied ("Yes" at step 635, step 640), in a case where a distance between the vehicle and the intersection is equal to or shorter than a distance threshold and the vehicle is predicted to change a moving direction to a particular direction ("Yes" at step 620), the left-or-right-turn-condition being a condition that is satisfied when the vehicle is permitted to change the moving direction to the particular direction in a traveling lane in which the vehicle is running; and
a second step (step 815, step 830) for performing the deceleration control using the target deceleration.

In the present disclosure, a program storage device, readable by machine, storing a program for assisting driving of a driver of a vehicle,
the program causes a processor (computer 20) of the vehicle to implement processes of:
a first step (step 650, step 710, step 725) for determining a magnitude of a target deceleration of the vehicle while performing the deceleration control so as to make a magnitude of the target deceleration of the vehicle while performing the deceleration control of when a left-or-right-turn-condition is not satisfied ("No" at step 625, "No" at step 630, "No" at step 635) smaller than a magnitude of the target deceleration of the vehicle while performing the deceleration control of when the left-or-right-turn-condition is satisfied ("Yes" at step 635, step 640), in a case where a distance between the vehicle and the intersection is equal to or shorter than a distance threshold and the vehicle is predicted to change a moving direction to a particular direction ("Yes" at step 620), the left-or-right-turn-condition being a condition that is satisfied when the vehicle is permitted to change the moving direction to the particular direction in a traveling lane in which the vehicle is running; and
a second step (step 815, step 830) for performing the deceleration control using the target deceleration.

According to the method and the program, the above-described possibility that the uneasiness is mitigated can be further increased, and the above-described possibility that the vehicle is sufficiently decelerated can be further increased.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

BRIEF DESCRIPTION OF THE DRAWINGS

FIG. 2 is a drawing for describing necessity degree information according to the embodiment.

FIG. 10 is a drawing for describing individual necessity degree information according to a first modification of the embodiment of the present disclosure.

DETAILED DESCRIPTION (Configuration)

Figure 1:
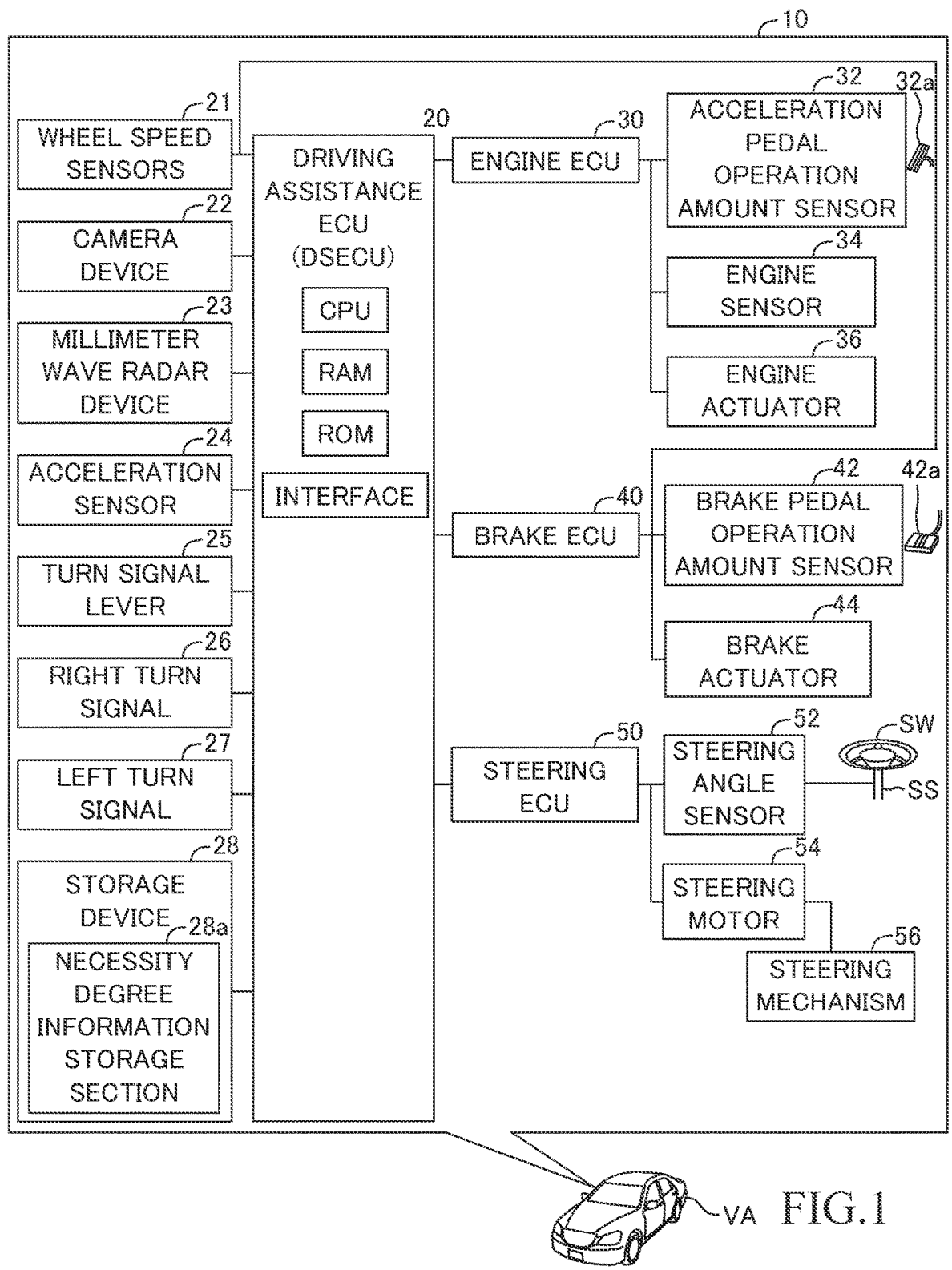
FIG. 1 is a schematic system diagram of a driving assistance apparatus according to an embodiment of the present disclosure.

As shown in FIG. 1, a driving assistance apparatus (hereinafter, referred to as a "present assistance apparatus") 10 according to an embodiment of the present disclosure is applied to (or installed in) a vehicle (sometimes referred to as "a host vehicle") VA.

The present assistance apparatus 10 comprises a driving assistance/support ECU 20, an engine ECU 30, a brake ECU 40, and a steering ECU 50. Hereinafter, the driving assistance ECU 20 is referred to as a "DSECU 20".

Each of these ECUs is a control unit (i.e., an Electronic Control Unit) that is sometimes referred to as a "controller" or a "computer", and includes a microcomputer as a main component. The microcomputer includes a CPU, a ROM, a RAM, and an interface (I/F). The ECUs are communicably connected with each other so as to be able to mutually exchange data through a CAN (Controller Area Network). The CPU is configured or programmed to realize various functions by executing instructions, programs, or routines stored in the ROM. Some or all of the ECUs may be integrated into a single ECU.

The present assistance apparatus 10 comprises wheel speed sensors 21, a camera device 22, and a millimeter wave radar device 23, an acceleration sensor 24, a turn signal lever 25, a right turn signal 26, a left turn signal 27, and storage device 28. They are connected to the DSECU 20 so as to mutually exchange data therebetween.

The wheel speed sensors 21 are provided to respective wheels of the vehicle VA. Each of the wheel speed sensors 21 generates one wheel pulse signal when the corresponding wheel rotates by a predetermined angle. The DSECU 20 counts the number of the wheel pulse signals from each of the wheel speed sensors 21 per unit time, and obtains a wheel rotational speed (or a wheel speed) of each of the wheels based on the counted number. The DSECU 20 obtains a vehicle speed Vs indicative of a moving speed of the vehicle VA based on the wheel rotational speeds of the wheels. For instance, the DSECU 20 obtains an average of the wheel speeds of four of the wheels as the vehicle speed Vs.

The camera device 22 is arranged at an upper part of a front windshield and at a center of the front windshield, inside a cabin of the vehicle VA. The camera device 22 is configured to obtain/capture an image (hereinafter, referred to as a "camera image") of a predetermined area in front of (or ahead of) the vehicle VA. The camera device 22 is configured to obtain, based on the camera image, object information and white line information, and transmit camera object information including the object information, the white line information, and the camera image, to the DSECU 20.

Figure 3:
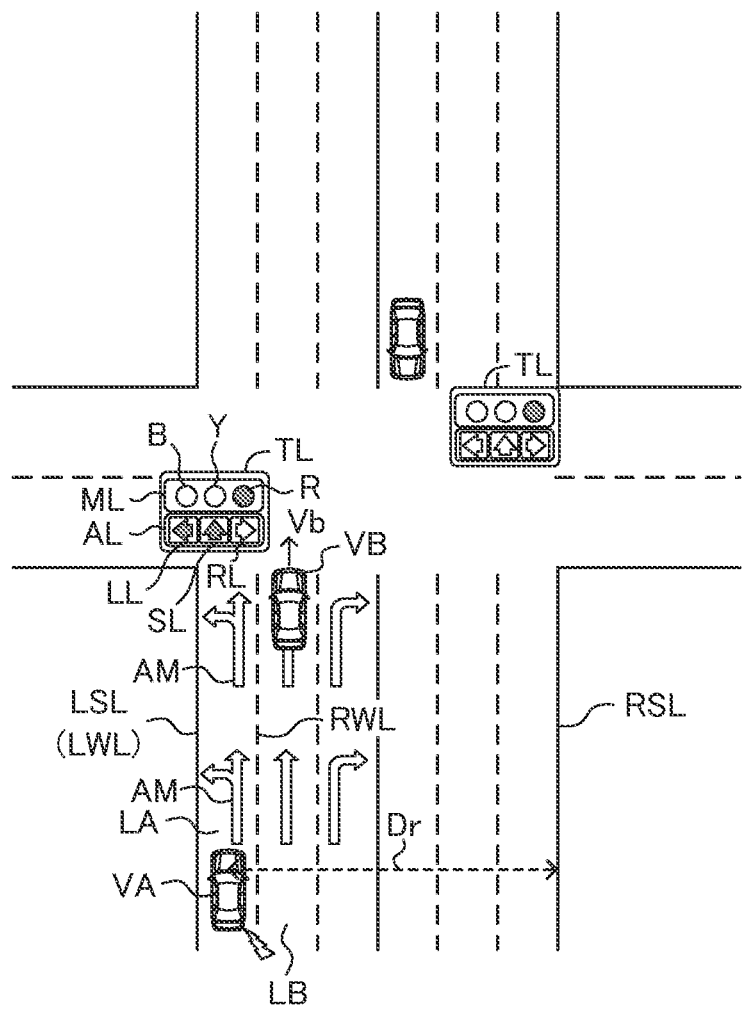
FIG. 3 is a bird's-eye view of an area in the vicinity of an intersection for describing the situation 1 shown in FIG. 2.
Figure 4:
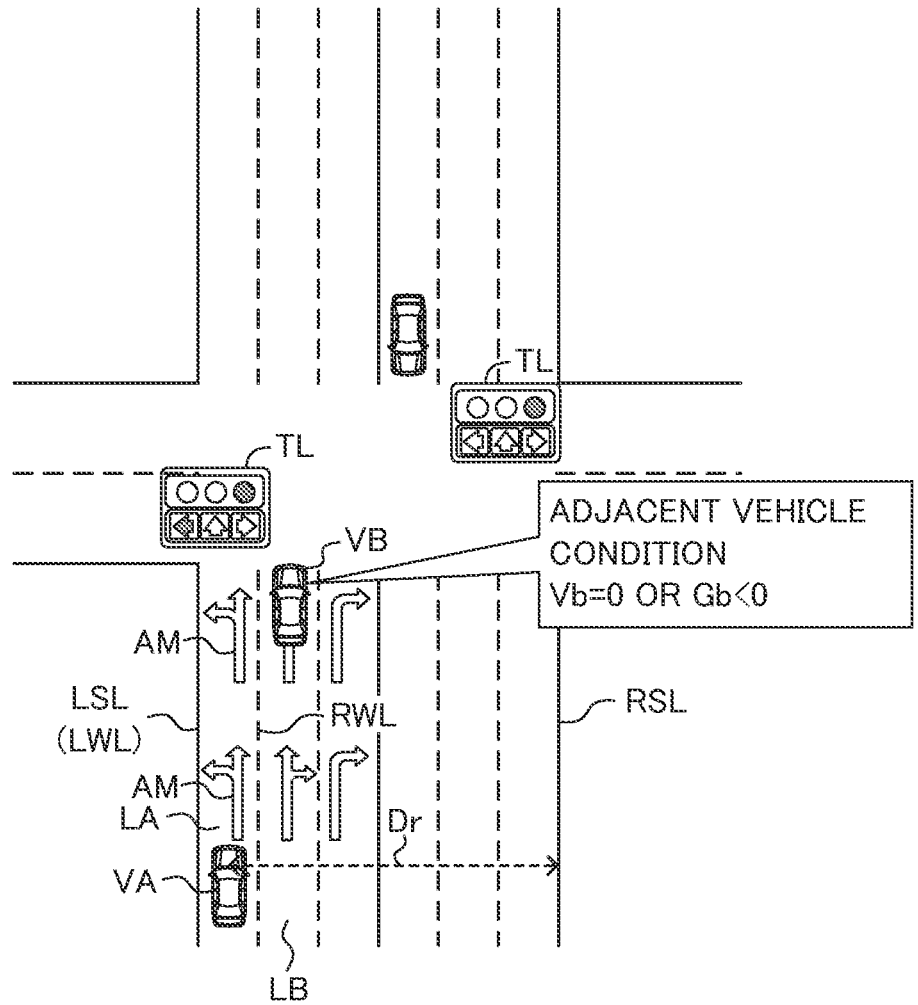
FIG. 4 is a bird's-eye view of an area in the vicinity of an intersection for describing the situation 2 shown in FIG. 2.
Figure 5:
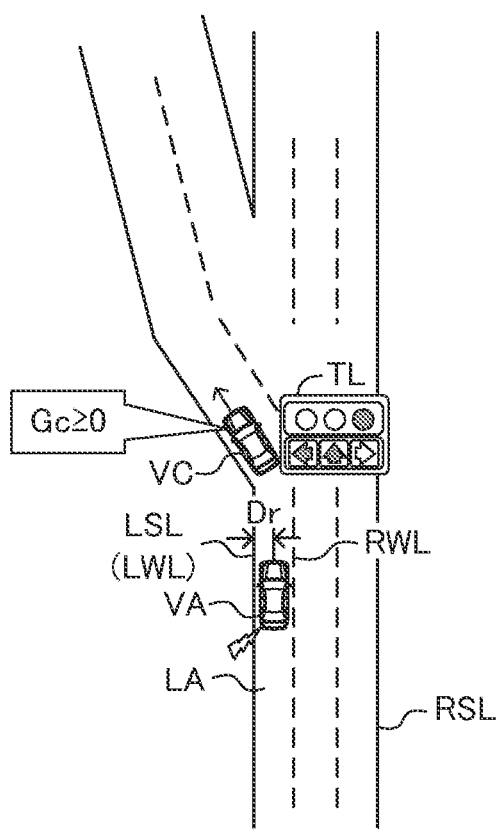
FIG. 5 is a bird's-eye view of an area in the vicinity of an intersection for describing the situation 3 shown in FIG. 2.

More specifically, the camera device 22 detects, based on the camera image, objects such as a traffic light TR (refer to FIGS. 3-5), other vehicles VB and VC (refer to FIGS. 3-5). Furthermore, the camera device 22 obtains (specifies) a distance to the detected object, and a direction/orientation of the detected object. Object information includes a type (i.e., traffic light TR, other vehicle), the distance, and the direction, of the detected object.

The camera device 22 detects, based on the camera image, a white line and the like painted on a road exemplified below, and obtains (specifies) a position of each of them with respect to the vehicle VA.

A right white line RWL (refer to FIGS. 3-5) and a left white line LWL (refer to FIGS. 3-5), that define (or demarcate) a traveling lane LA in which the vehicle VA is currently running.

An arrow road sign AM painted on a surface of a road including the traveling lane (refer to FIGS. 3 and 4).

A right road shoulder (a right road end) RSL that is a right side end of the road including the traveling lane (refer to FIGS. 3-5), and a left road shoulder (a left road end) LSL that is a left side end of the road including the traveling lane (refer to FIGS. 3-5), White line information includes a type of a white line, and a position of the white line (with respect to the vehicle VA).

The millimeter wave radar device 23 radiates/transmits a millimeter wave to an area ahead of the vehicle VA. The millimeter wave radar device 23 is a well-known sensor that detects an object by receiving a millimeter wave that is a reflected wave generated by an object. The millimeter wave radar device 23 obtains, through calculation based on the received reflected wave, a distance (object distance) to the object, a relative speed (object relative speed) Vr of the object with respect to the vehicle VA, and a direction of the object. The millimeter wave radar device 23 transmits radar object information to the DSECU 20 every time a predetermined time elapses. The radar object information includes "the object distance, the object relative speed Vr, and the direction of the object".

The DSECU 20 specifies/obtains the position of the object present ahead of (in front of) the vehicle VA with respect (or relative) to the vehicle VA, based on the camera object information and the radar object information.

The acceleration sensor 24 measures an acceleration G of the vehicle in a front-rear direction of the vehicle VA so as to generate a detected signal indicative of the acceleration G. The DSECU 20 specifies/obtains the acceleration G of the vehicle in the front-rear direction of the vehicle VA based on the detected signal from the acceleration sensor 24.

The turn signal lever 25 is arranged in the vicinity of the steering wheel SW. When the driver operates/rotates the turn signal 25 counterclockwise (that is, to a left operating direction, e.g., in an upper direction), the left turn signal 27 is caused to operate (blink). When the driver operates/rotates the turn signal lever 25 clockwise (that is, to a right operating direction, e.g., in a lower direction), the right turn signal 26 is caused to operate (blink).

The left turn signal 27 includes lighting devices, one of which is arranged at a left side of a front end of the vehicle VA, and the other of which is arranged at the left side of a rear end of the vehicle VA. The right turn signal 26 includes lighting devices, one of which is arranged at a right side of the front end of the vehicle VA, and the other of which is arranged at the right side of the rear end of the vehicle VA.

When the driver intends to change a moving direction of the vehicle VA to the left, the driver operates the turn signal lever 25 counterclockwise so as to cause the left turn signal 27 to operate (blink). When the driver intends to change the moving direction of the vehicle VA to the right, the driver operates the turn signal lever 25 clockwise so as to cause the right turn signal 26 to operate (blink).

The storage device 28 includes a non-volatile, readable and writable storage medium. The DSECU 20 is configured to store information in the storage device 28, and to read the stored information from the storage device 28. The storage device 28 includes a necessity degree information storage section 28a in which necessity degree information described later (refer to FIG. 2) is stored.

For example, the storage device 28 may be a HDD (Hard Disk Drive), an SSD (Solid State Drive), or the like, but is not limited to those. That is, the storage device 28 can be any type of well-known storage devices or storage mediums that are writable and readable.

The engine ECU 30 is connected with an acceleration pedal operation amount sensor 32 and an engine sensor 34, and receives detection signals from them.

The acceleration pedal operation amount sensor 32 is configured to detect an operation amount (i.e., an acceleration pedal operation amount AP) of an acceleration pedal 32a of the vehicle VA. When the driver does not operate the acceleration pedal 32a, the acceleration pedal operation amount AP is "0".

The engine sensor 34 is for detecting operating state amounts of an unillustrated "internal combustion engine serving as a driving source of the vehicle VA". The engine sensor 34 may include a throttle valve opening amount sensor, an engine rotational speed sensor, and an intake air amount sensor.

The engine ECU 30 is further connected with an engine actuator 36 that may be a throttle valve actuator and fuel injectors. The engine ECU 30 is configured to drive the engine actuator 36 to change a torque generated by the internal combustion engine so as to adjust a driving force of the vehicle VA.

The engine ECU 30 determines a target throttle valve opening TAtgt in such a manner that the target throttle valve opening TAtgt becomes greater as the acceleration pedal operation amount AP becomes greater. The engine ECU 30 drives the throttle valve actuator so as to make a throttle valve opening equal to the target throttle valve opening TAtgt.

The brake ECU 40 is connected with the wheel speed sensors 21 and a brake pedal operation amount sensor 42, and receives detected signals from them.

The brake pedal operation amount sensor 42 is configured to detect an operation amount (i.e., a brake pedal operation amount BP) of a brake pedal 42a of the vehicle VA. When the driver does not operate the brake pedal 42a, the brake pedal operation amount BP is "0".

The brake ECU 40 is configured to obtain the vehicle speed Vs base on the wheel pulse signals from each of the wheel speed sensors 21, similarly to the DSECU 20. The brake ECU 40 may be configured to receive the vehicle speed Vs from the DSECU 20.

The brake ECU 40 is further connected with a brake actuator 44 that is a hydraulic control actuator. The brake actuator 44 is disposed in an unillustrated hydraulic circuit between an unillustrated master cylinder for pressurizing a hydraulic oil in accordance with a pedal force of the brake pedal 42a and unillustrated well-known friction brake devices including wheel cylinders provided at the respective wheels. The brake actuator 44 can adjust/change a pressure of the hydraulic oil supplied to the wheel cylinders so as to adjust/control a brake force of the vehicle VA.

The brake ECU 40 determines a target operation acceleration that is negative, based on the brake pedal operation amount BP. The brake ECU 40 drives the brake actuator 44 so as to make an actual acceleration of the vehicle VA equal to the target operation acceleration.

The steering ECU 50 is connected with a steering angle sensor 52 and a steering motor 54.

The steering angle sensor 52 is configured to detect, as a steering angle θs, a rotating angle of the steering wheel SW from a neutral position so as to generate a signal indicative of the steering angle θs. The steering ECU 50 obtains the steering angle θs based on the signal generated by the steering angle sensor 52.

The steering motor 54 is incorporated into and is capable of transmitting a torque to "a steering mechanism 56 including the steering wheel SW, a steering shaft SS, and steering gear mechanism". The steering motor 54 generates the torque in accordance with "an electric power supplied from an unillustrated battery of the vehicle VA" whose magnitude and direction are controlled by the steering ECU 50. The torque generates a steering assist torque, or steers a right steered wheel and a left steered wheel.

The steering ECU 50 is configured to let the steering motor 54 generate the steering assist torque, in accordance with "a steering torque generated in the steering shaft SS caused by an operation to the steering wheel by the driver.

(Outline of Operation)

The present assistance apparatus 10 performs a decelerating control, when a start condition becomes satisfied. The start condition becomes satisfied, when a distance Dtl between the vehicle VA and an intersection is equal to or shorter than a threshold distance Dth and the vehicle VA is about to (or is going to, is predicted to) change a moving direction. The decelerating control is a control to decelerate the vehicle VA in such a manner that the vehicle speed Vs is decreased to (or becomes equal to) a predetermined target vehicle speed Vtgt.

When the above-described start condition becomes satisfied, the present assistance apparatus 10 determines whether or not a left-or-right-turn-condition is satisfied. The left-or-right-turn-condition is satisfied when changing a movement direction of the vehicle VA from/in the traveling lane LA in which the vehicle is currently running is permitted (refer to FIGS. 3-5).

A possibility that the vehicle VA makes a right turn or a left turn at an intersection when the left-or-right-turn-condition is satisfied is higher than when the left-or-right-turn-condition is not satisfied. In other words, since a possibility that the vehicle VA makes a right turn or a left turn at an intersection when the left-or-right-turn-condition is not satisfied is lower than when the left-or-right-turn-condition is satisfied, a possibility that the decelerating control is erroneously performed is higher (a necessity that the decelerating control is performed is lower) when left-or-right-turn-condition is not satisfied.

Thus, the present assistance apparatus 10 is configured to, when the left-or-right-turn-condition is not satisfied, perform the decelerating control that causes the vehicle to decelerate at a deceleration having a magnitude smaller than a magnitude of deceleration (realized) in the deceleration control performed when the left-or-right-turn-condition is satisfied.

Therefore, the present assistance apparatus 10 is capable of:

increasing a possibility that the uneasiness that the passenger of the vehicle feels when the decelerating control is erroneously performed is mitigated; and increasing a possibility that the vehicle is sufficiently decelerated (i.e., the vehicle speed Vs can be decreased so as to become equal to the above-described target vehicle speed Vtgt) when the decelerating control is properly/appropriately performed.

(Example of Operation)

Firstly, an example of determining whether or not the left-or-right-turn-condition is satisfied is described.

The present assistance apparatus 10 specifies/determines a direction that the operating turn signal indicates as a "predicted moving direction", based on an operation to the turn signal lever 25. More specifically, the present assistance apparatus 10 determines that the predicted moving direction is "right" when the turn signal lever 25 is operated to cause the right turn signal 26 to operate (blink), and that the predicted moving direction is "left" when the turn signal lever 25 is operated to cause the left turn signal 27 to operate (blink).

The present assistance apparatus 10 recognizes the arrow road sign AM in/on the traveling lane LA (refer to FIGS. 3 and 4) based on the camera image transmitted from the camera device 22, and specifies a direction of an arrow of the recognized arrow road sign AM. The direction of the arrow indicates a direction to which the vehicle VA is permitted to move from/in the traveling lane LA, and is sometimes referred to as a "permitted lane direction (or a permitted moving direction)".

The present assistance apparatus 10 recognizes an arrow signal of an arrow light AL of a traffic light TL (refer to FIGS. 3 and 4) based on the camera image, and specifies a direction of the arrow signal.

When the predicted moving direction, the direction of the arrow signal, and the permitted lane direction coincide with each other, the present assistance apparatus 10 determines that the movement (changing the movement direction of the vehicle VA) to the predicted moving direction (movement toward the turning direction) from/in the traveling lane LA is permitted so as to determine that the left-or-right-turn-condition is satisfied.

When the left-or-right-turn-condition is satisfied, the present assistance apparatus 10 sets a necessity degree α to "1.0", and thereafter, performs the deceleration control. The necessity degree α is indicative of a need (necessity degree) of the deceleration control (how necessary the deceleration control is). The necessity degree α is equal to or larger than "0" and is equal to or smaller than "1". The necessity degree α is higher as the need of the deceleration control is greater, and the necessity degree α is lower as the need of the deceleration control is smaller.

The present assistance apparatus 10 obtains a target acceleration Gtgt by applying the necessity degree α and the current vehicle speed Vs to a following equation (1) in the deceleration control.

$$Gtgt = \alpha \cdot Ga \cdot (Vtgt - Vs) \quad (1)$$

α: necessity degree
Ga: predetermined gain (0≤Ga≤1)

The start condition further includes a condition that the vehicle speed Vs is higher than the target vehicle speed Vtgt. Therefore, the target acceleration that the present assistance apparatus 10 obtains in the deceleration control is negative. In other words, the present assistance apparatus 10 obtains the target deceleration for (used in) the deceleration control.

Whereas, when the left-or-right-turn-condition is not satisfied, the present assistance apparatus 10 refers to the necessity degree information shown in FIG. 2. If there is a situation (case) that matches with a current surrounding condition of the vehicle VA in the necessity degree information, the present assistance apparatus 10 obtains the necessity degree α corresponding to the matched situation. The matched situation may be referred to as a "matched condition".

As shown in FIG. 2, in the necessity degree information, situations 1 to 3, conditions to be satisfied for the situations 1 to 3, and the necessity degrees α for the situations 1 to 3 are respectively recorded (stored) in such a manner that they are interrelated with each other.

The situations 1 to 3 will next be described.

<Situation 1>

The conditions to be satisfied for the situation 1 is described with reference to FIG. 3.

The present assistance apparatus 10 determines that the current surrounding condition of the vehicle VA is the situation 1, when both of a condition 1A and a condition 1B are satisfied.

Condition 1A: a road shoulder distance Dr is equal to or longer than a predetermined road shoulder distance threshold Drth.

Condition 1B: an adjacent vehicle speed Vb is equal to or higher than a predetermined speed threshold Vbth.

The road shoulder distance Dr is a distance between the vehicle VA and a particular road shoulder (an edge) of a road that includes the traveling lane LA. The particular road shoulder is either a left road shoulder (left road edge) LSL or a right road shoulder (right road edge) RSL, and the shoulder located in the side of the predicted moving direction. In the example shown in FIG. 3, the predicted moving direction is "right". Therefore, in this example, the road shoulder distance Dr is a distance between the vehicle VA and the right road shoulder RSL that is the particular road shoulder.

It should be noted that the road shoulder distance threshold Drth has been set at a width of a single lane, for instance.

The adjacent vehicle speed Vb is a vehicle speed of an "adjacent vehicle VB" that is an other vehicle VB running (traveling) in an "adjacent lane LB that is adjacent to the traveling lane LA in the predicted moving direction of the vehicle VA traveling in the traveling lane LA".

It should be noted that the speed threshold Vbth has been set at a current vehicle speed Vs of the vehicle VA, for instance.

When the vehicle VA changes the moving direction toward the road shoulder having the road shoulder distance Dr that is equal to or longer than the road shoulder distance threshold Drth, it is likely that the vehicle VA changes lanes to the adjacent lane LB. In this case, if the adjacent vehicle VB is running in the adjacent lane LB at a vehicle speed equal to or higher than the speed threshold Vbth, it is not necessary for the vehicle VA to decelerate after the vehicle starts running in the adjacent lane LB. Accordingly, in the situation 1, the necessity degree for the deceleration control to be performed is small.

In view of the above, the necessity degree α for the situation 1 is set at "0.2". Therefore, the magnitude of the target acceleration Gtgt in the deceleration control in the situation 1 is smaller than the magnitude of the target acceleration Gtgt obtained when the left-or-right-turn-condition is satisfied.

In this manner, in the situation 1, the need for the deceleration control to be performed is small, and thus, the magnitude of the target acceleration Gtgt in the deceleration control is made smaller. Accordingly, a possibility that the uneasiness that the passenger/driver feels when the decelerating control is performed in the situation 1 can be mitigated is increased.

Here, the traffic light TL will next be described with reference to FIG. 3.

The traffic light TL comprises a main light ML and an arrow light AL.

The main light ML indicates (turns on) any one of a green (blue) light B, a yellow light Y, and a red light R. When the main light ML indicates (turns on) either the yellow light Y or the red light R, the traffic light TL indicates that the vehicle VA should be stopped. The yellow light Y and the red light R may be referred to as a "stop light". When the main light ML indicates (turns on) the green light B, the traffic light TL indicates that the vehicle VA is permitted to move to any direction. The green light B may be referred to as a "permission light".

When the main light ML indicates (turns on) the stop light, there is a case where the arrow light AL indicates (turns on) at least one of a left arrow light LL, a straight arrow light SL, and a right arrow light RL. In this case, the traffic light TL indicates that the vehicle VA is permitted to move to a direction according to the arrow indicated by the arrow light AL.

It should be noted that there is a traffic light TL having no arrow light AL.

In the example shown in FIG. 3, whereas the main light ML indicates (turns on) the red light R, the arrow light AL indicates the left arrow light LL and the straight arrow light SL. Thus, the traffic light TL permits a straight moving and a left turn. In addition, the vehicle VA intends/plans to change the moving direction to the right, and the arrow road sign AM on the traveling lane LA permits a straight moving and a left turn. Therefore, the left-or-right-turn-condition is not satisfied.

In the example shown in FIG. 3, the adjacent vehicle VB is about to move straight through the intersection. In this situation, if the driver of the vehicle VA causes the right turn signal 26 to operate (blink), there is a high likelihood that the driver changes the moving direction of the vehicle VA with an intention to change lanes to the adjacent lane LB, and without an intention to make a left or right turn. In addition, a possibility that the vehicle VA needs to be decelerated after the vehicle VA finishes the lane change and starts running in the adjacent lane LB is low. In this case, since both of the condition 1A and the condition 1B are satisfied, the deceleration control is performed using the necessity degree α set at "0.2". Therefore, the uneasiness that the passenger/driver feels can be mitigated.

<Situation 2>

The conditions to be satisfied for the situation 2 is described with reference to FIG. 4.

The present assistance apparatus 10 determines that the current surrounding condition of the vehicle VA is the situation 2, when both of a condition 2A and a condition 2B are satisfied.

Condition 2A: the road shoulder distance Dr is equal to or longer than the road shoulder distance threshold Drth.

Condition 2B: the adjacent vehicle speed Vb is "0", or an adjacent vehicle acceleration Gb that is an acceleration of the adjacent vehicle VB is negative.

It should be noted that the condition 2B may be referred to as an "adjacent vehicle condition".

When the condition 2A is satisfied, it is likely that the vehicle VA changes lanes to the adjacent lane LB. In addition, when the condition 2B is satisfied, it is likely that the deceleration of the vehicle VA is necessary after the vehicle VA finishes changing lanes and starts running in the adjacent lane LB, since the adjacent vehicle VB is stopped (Vn=0) or is being decelerated (Gb<0). Accordingly, in the situation 2, the need for the deceleration control to be performed is great. Thus, the necessity degree α for the situation 2 is set at "0.8" that is larger than the necessity degree α (=0.2) for the situation 1.

In this manner, in the situation 2, a possibility that the deceleration control needs to be performed is high even though the left-or-right-turn-condition is not satisfied. Therefore, the magnitude of the target acceleration Gtgt in the deceleration control in the situation 2 is set at a value greater than the magnitude of the target acceleration Gtgt in the situation 1. Accordingly, a possibility that the vehicle VA cannot sufficiently be decelerated in the situation 2 is decreased.

In the example shown in FIG. 4, unlike the example shown in FIG. 3, the arrow light AL indicates the left arrow light LL only, but does not indicate the straight arrow light SL. Thus, the traffic light TL permits a left turn only. In this case, it is likely that the adjacent vehicle VB has stopped before/at the traffic light TL or has been decelerating in order to stop before/at the traffic light TL, and thus, it is likely that the vehicle VA needs to be decelerated. In the example shown in FIG. 4, since both of the condition 2A and the condition 2B are satisfied, the deceleration control is performed using the necessity degree α set at "0.8". Therefore, the vehicle VA can change lanes while being decelerated, and a possibility that the vehicle VA cannot sufficiently be decelerated is decreased.

<Situation 3>

The conditions to be satisfied for the situation 3 is described with reference to FIG. 5.

The present assistance apparatus 10 determines that the current surrounding condition of the vehicle VA is the situation 3, when both of a condition 3A and a condition 3B are satisfied.

Condition 3A: the road shoulder distance Dr is shorter than the road shoulder distance threshold Drth.

Condition 3B: a preceding vehicle acceleration Gc is equal to or greater than "0". The preceding vehicle acceleration Gc is an acceleration of a preceding vehicle VC that is a vehicle running ahead (in front) of the vehicle VA in the traveling lane LA. In other words, the condition 3B is satisfied when the preceding vehicle VC is being accelerated or running at a constant speed (i.e., when the preceding vehicle VC is not being decelerated).

When the vehicle VA changes the moving direction toward the road shoulder having the road shoulder distance Dr shorter than the road shoulder distance threshold Drth (i.e., when the condition 3A is satisfied), it is likely that there is no adjacent lane LB in the side of the predicted moving direction, and thus a possibility that vehicle VA changes lanes is low. Accordingly, when the condition 3A is satisfied, a possibility that the vehicle VA makes a left or right turn. However, since the preceding vehicle VC is not decelerating (i.e., the condition 3A is satisfied) in the situation 3, the need for the deceleration control to be performed is small. For example, as shown in FIG. 5, when the vehicle VA can make a left or right turn with a relatively small steering angle θs, a possibility that the preceding vehicle VC is not decelerating is high. In a case where such a left or right turn is made, the need for the deceleration control to be performed is small.

In view of the above, the necessity degree α for the situation 3 is set at "0.2". Therefore, the magnitude of the target acceleration Gtgt in the deceleration control in the situation 3 is smaller than the magnitude of the target acceleration Gtgt obtained when the left-or-right-turn-condition is satisfied. Accordingly, a possibility that the uneasiness that the passenger/driver feels when the decelerating control is performed in the situation 3 can be mitigated is increased.

It should be noted that the necessity degree α for the situation 1 and the necessity degree α for the situation 3 may be different from each other.

(Specific Operation)

<Start Condition Determining Routine>

Figure 6:
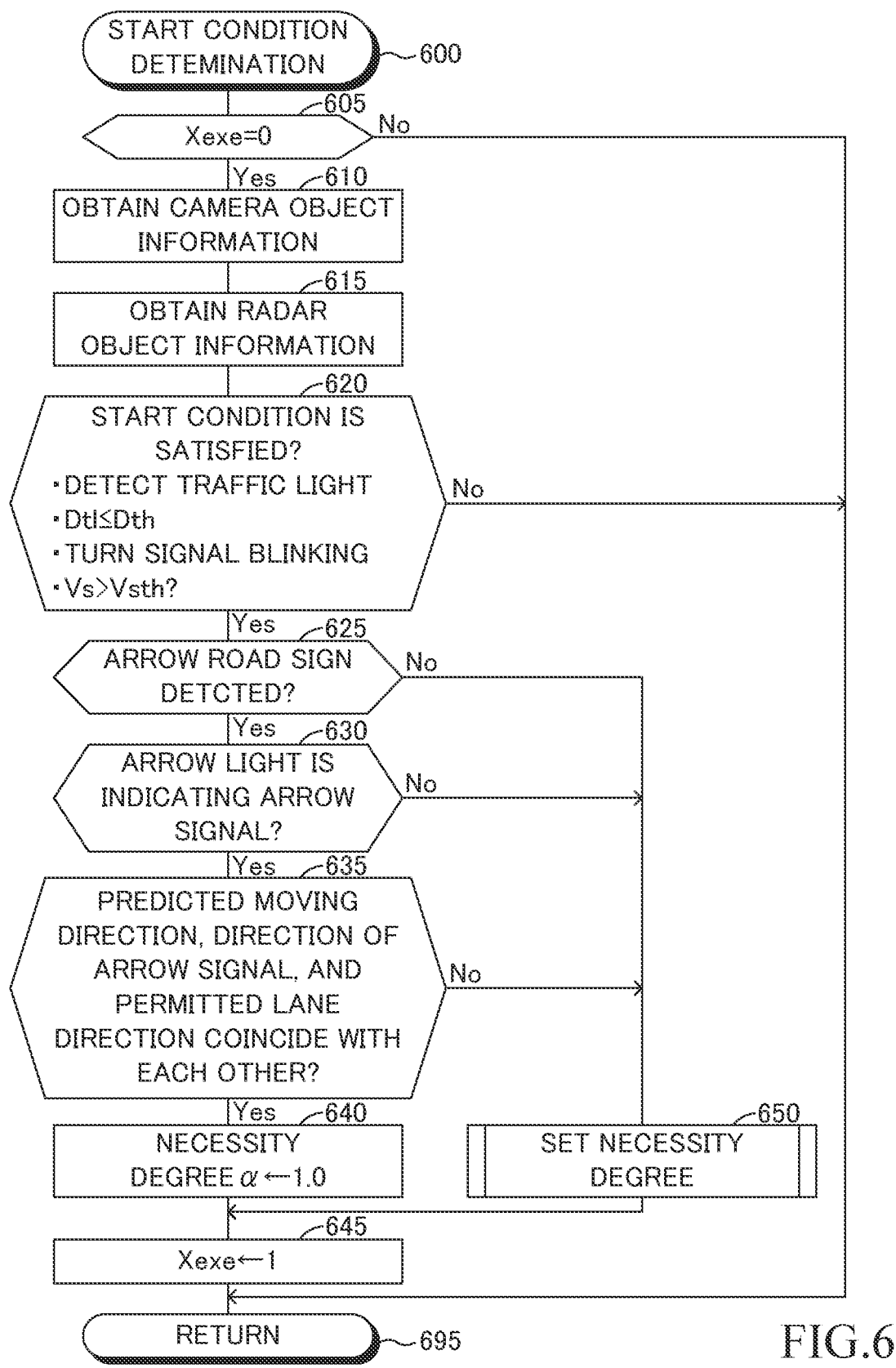
FIG. 6 is a flowchart illustrating a start condition determining routine executed by a CPU of a driving assistance ECU shown in FIG. 1.

The CPU of the DSECU 20 is configured or programmed to execute a start condition determining routine shown by a flowchart in FIG. 6 every time a predetermined time elapses. Hereinafter, a "CPU" means the CPU of the DSECU 20, unless otherwise specified.

When an appropriate time point comes, the CPU starts processing from step 600, and proceeds to step 605. At step 605, the CPU determines whether or not a value of an execution flag Xexe is "0".

The value of the execution flag Xexe is set to "1" when a start condition becomes satisfied, and is set to "0" when a predetermined end condition becomes satisfied. It should be noted that the value of the execution flag Xexe is set to "0" in an initialization routine. When the value of the execution flag Xexe is "1", the deceleration control is performed. The initialization routine is executed by the CPU when a position of an unillustrated ignition key switch of the vehicle VA is switched from an off position to an on position.

When the value of the execution flag Xexe is "0", the CPU makes a "Yes" determination at step 605, and sequentially executes the processes of step 610 to step 620.

Step 610: the CPU obtains the camera object information from the camera device 22.

Step 615: the CPU obtains the radar object information from the millimeter wave radar device 23.

Step 620: the CPU determines whether or not the start condition is satisfied. The CPU determines that the start condition is satisfied when all of the following conditions SA to SD are satisfied.

Condition SA: a traffic light TR facing the vehicle VA is detected based on the object information included in the camera object information.

Condition SB: the distance Dtl between the vehicle VA and the intersection is equal to or shorter than the threshold distance Dth.

Condition SC: either the right turn signal 26 or the left turn signal 27 is being operated (blinking).

Condition SD: the vehicle speed Vs is higher than the predetermined target vehicle speed Vtgt.

When the start condition is not satisfied (i.e., when at least one of the conditions SA to SD is not satisfied), the CPU makes a "No" determination at step 620, and proceeds to step 695 to terminate the present routine tentatively.

Whereas, when the start condition is satisfied (i.e., when all of the conditions SA to SD are satisfied), the CPU makes a "Yes" determination at step 620, and proceeds to step 625. At step 625, the CPU determines whether or not the arrow road sign AM has been detected based on the white line information included in the camera object information.

When the arrow road sign AM has been detected, the CPU makes a "Yes" determination at step 625, and proceeds to step 630. At step 630, the CPU determines whether or not the arrow light AL of the traffic light TL (refer to FIG. 3) is indicating at least one of the arrow signals.

When the arrow light AL is indicating at least one of the arrow signals, the CPU makes a "Yes" determination at step 630, and proceeds to step 635. At step 635, the CPU determines whether or not the predicted moving direction, the direction of the arrow signal, and the permitted lane direction coincide with each other.

When the predicted moving direction, the direction of the arrow signal, and the permitted lane direction coincide with each other, the CPU determines that the left-or-right-turn-condition is satisfied. In this case, the CPU makes a "Yes" determination at step 635, and sequentially executes the processes of step 640 and step 645.

Step 640: the CPU sets the necessity degree α to "1.0".

Step 645: the CPU sets the value of the execution flag Xexe to "1".

Thereafter, the CPU proceeds to step 695 to terminate the present routine tentatively.

Whereas, when the predicted moving direction, the direction of the arrow signal, and the permitted lane direction do not coincide with each other, the CPU determines that the left-or-right-turn-condition is not satisfied and proceeds to step 650. At step 650, the CPU executes a necessity degree setting routine shown by a flowchart in FIG. 7. In the necessity degree setting routine, the CPU refers to the necessity degree information so as to determine the necessity degree α. Thereafter, the CPU proceeds to step 645 so as to set the value of the execution flag Xexe to "1", and proceeds to step 695 to terminate the present routine tentatively.

If the arrow road sign AM has not been detected when the CPU proceeds to step 625, the left-or-right-turn-condition cannot be satisfied. In this case, the CPU makes a "No" determination at step 625, proceeds to step 650 to set/determine the necessity degree α, and proceeds to step 645 to set the value of the execution flag Xexe to "1". Thereafter, the CPU proceeds to step 695 to terminate the present routine tentatively.

If the arrow light AL is not indicating any of the arrow signals when the CPU proceeds to step 630, or if the arrow light AL has not been detected when the CPU proceeds to step 630, the left-or-right-turn-condition cannot be satisfied. In this case, the CPU makes a "No" determination at step 630, proceeds to step 650 to set/determine the necessity degree α, and proceeds to step 645 to set the value of the execution flag Xexe to "1". Thereafter, the CPU proceeds to step 695 to terminate the present routine tentatively.

If the value of the execution flag Xexe is "1" when the CPU proceeds to step 605, the CPU makes a "No" determination at step 605, and proceeds to step 695 to terminate the present routine tentatively.

<Necessity Degree Setting Routine>

Figure 7:
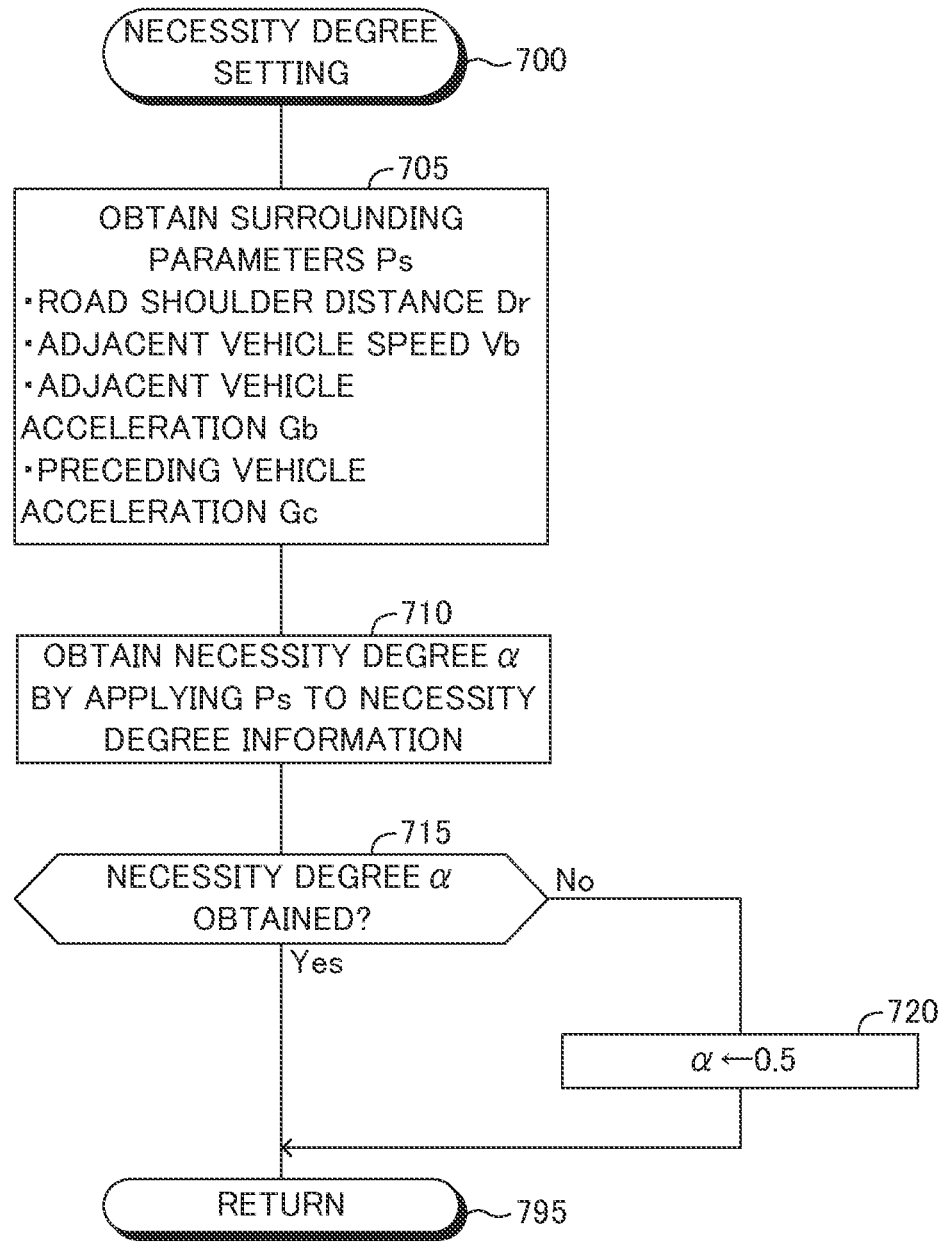
FIG. 7 is a flowchart illustrating a necessity degree setting routine executed by the CPU of the driving assistance ECU shown in FIG. 1.

When the CPU proceeds to step 650 shown in FIG. 6, the CPU starts processing from step 700 shown in FIG. 7, and sequentially executes the processes of step 705 to step 715.

Step 705: the CPU obtains various surrounding parameters Ps (i.e., the road shoulder distance Dr, the adjacent vehicle speed Vb, the adjacent vehicle acceleration Gb, and the preceding vehicle acceleration Gc) as follows.

The Road Shoulder Distance Dr

The CPU specifies/determines the predicted moving direction based on the operation to the turn signal lever 25 by the driver. Thereafter, the CPU selects one of the distance to the right road shoulder RSL and the distance to the left road shoulder LSL, that corresponds to the predicted moving direction, as the road shoulder distance Dr. The distance to the right road shoulder RSL and the distance to the left road shoulder LSL are both specified based on the white line information included in the camera object information.

The Adjacent Vehicle Speed Vb, and the Adjacent Vehicle Acceleration Gb

The CPU determines, based on the white line information included in the camera object information, whether or not the adjacent lane LB that is adjacent to the traveling lane LA in the predicted moving direction is present. When the adjacent lane LB is present, the CPU determines whether or not the adjacent vehicle VB running in the adjacent lane LB is present based on the camera object information and the radar object information. When the adjacent vehicle VB is present, the CPU obtains the adjacent vehicle speed Vb based on the relative speed of the adjacent vehicle VB specified based on the radar object information and the vehicle speed Vs of the vehicle VA. The CPU obtains the adjacent vehicle acceleration Gb by differentiating the adjacent vehicle speed Vb with respect to time.

It should be noted that the CPU obtains "obtainment impossible information indicating that the adjacent vehicle speed Vb and the adjacent vehicle acceleration Gb cannot be obtained", when the adjacent lane LB is not present or when the adjacent vehicle VB is not present.

The Preceding Vehicle Acceleration Gc

The CPU determines, based on the camera object information and the radar object information, whether or not the preceding vehicle VC is present. When the preceding vehicle VC is present, the CPU obtains the preceding vehicle speed Vc based on the relative speed of the preceding vehicle VC specified based on the radar object information and the vehicle speed Vs of the vehicle VA. The CPU obtains the preceding vehicle acceleration Gc by differentiating the preceding vehicle speed Vc with respect to time.

It should be noted that the CPU obtains "obtainment impossible information indicating that the preceding vehicle speed Vc and the preceding vehicle acceleration Gc cannot be obtained, when the preceding vehicle VC is not present.

Step 710: the CPU obtains the necessity degree $\alpha$ by applying the various surrounding parameters Ps to the necessity degree information.

When the various surrounding parameters Ps satisfies the conditions to be satisfied for any of the situations, the conditions being stored in the necessity degree information, the CPU obtains the necessity degree $\alpha$ corresponding to the situation whose conditions to be satisfied are met. If the various surrounding parameters Ps do not satisfy any of the conditions to be satisfied for any of the situations, the CPU does not obtain the necessity degree $\alpha$ from the necessity degree information.

Step 715: the CPU determines whether or not the necessity degree $\alpha$ has been successfully obtained at step 710.

When the necessity degree $\alpha$ has been successfully obtained at step 710, the CPU makes a "Yes" determination at step 715, and proceeds to step 795 to terminate the present routine tentatively.

Whereas, when the necessity degree $\alpha$ has not been successfully obtained at step 710, the CPU makes a "No" determination at step 715, and proceeds to step 720. At step 720, the CPU sets the necessity degree $\alpha$ to "0.5". Thereafter, the CPU proceeds to step 795 to terminate the present routine tentatively.

It should be noted that the value (i.e., "0.5") to which the necessity degree $\alpha$ is set at step 720 can be any arbitrary value between the maximum value of the necessity degree $\alpha$ and the minimum value of the necessity degree $\alpha$, both being recorded/stored in the necessity degree information.

<Deceleration Control Routine>

Figure 8:
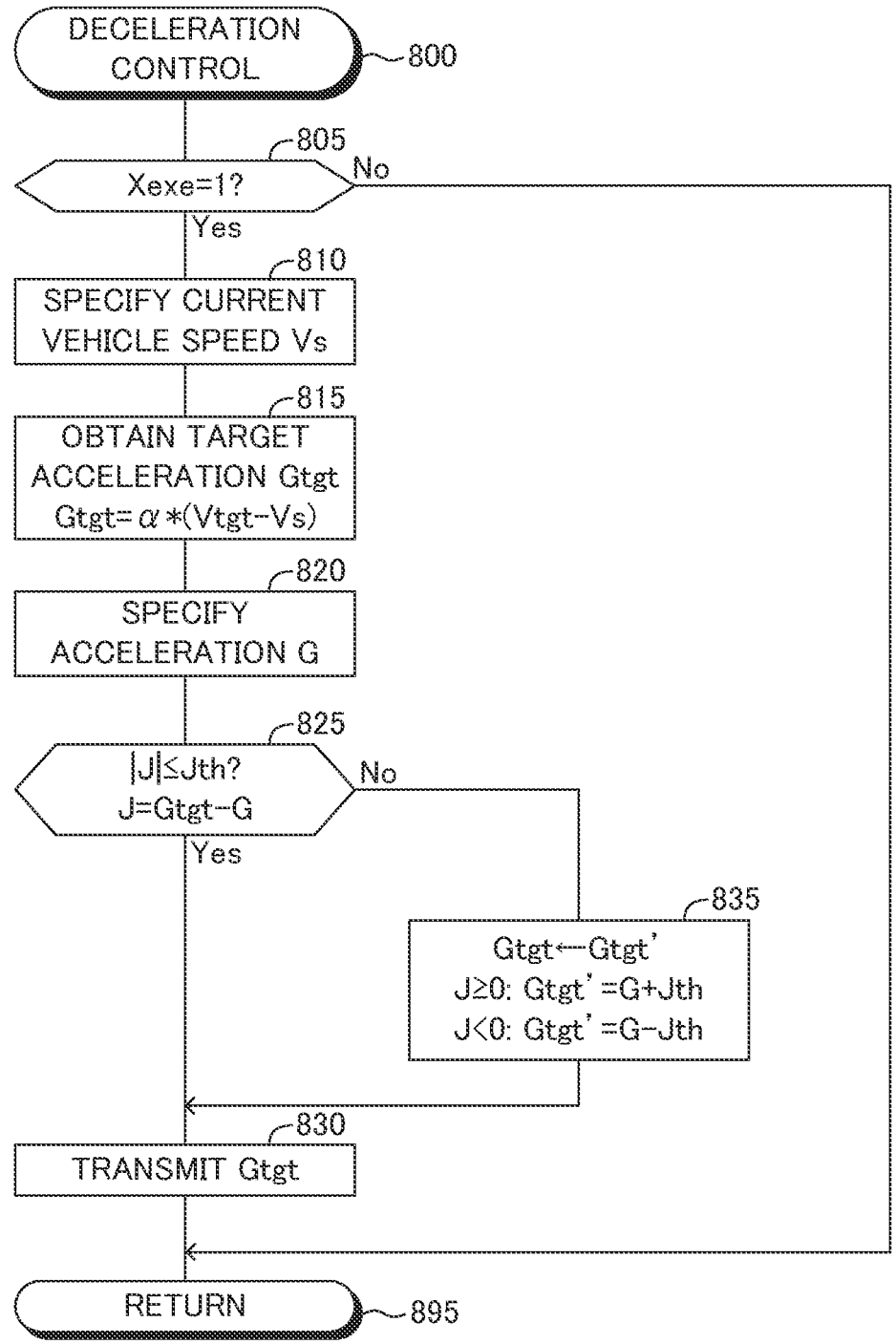
FIG. 8 is a flowchart illustrating a deceleration control routine executed by the CPU of the driving assistance ECU shown in FIG. 1.

The CPU is configured or programmed to execute a deceleration control routine shown by a flowchart in FIG. 8 every time a predetermined time elapses.

When an appropriate time point comes, the CPU starts processing from step 800 shown in FIG. 8, and proceeds to step 805. At step 805, the CPU determines whether or not the value of the execution flag Xexe is "1".

When the value of the execution flag Xexe is "0", the CPU makes a "No" determination at step 805, and proceeds to step 895 to terminate the present routine tentatively.

Whereas, when the value of the execution flag Xexe is "1", the CPU makes a "Yes" determination at step 805, and sequentially executes the processes of step 810 to step 825.

Step 810: the CPU specifies/obtains the current vehicle speed Vs.

Step 815: the CPU obtains the target acceleration Gtgt by applying the necessity degree $\alpha$ and the current vehicle speed Vs to the above-described equation (1).

Step 820: the CPU specifies/obtains the current acceleration G based on the detected signal from the acceleration sensor 24.

Step 825: the CPU determines whether or not a magnitude (absolute value) of a jerk (rate of change of acceleration) J is equal to or smaller than a jerk threshold Jth.

The jerk is a differential value of the acceleration with respect to time. In this example, a value obtained by subtracting the acceleration G from the target acceleration Gtgt is used as the jerk J.

When the magnitude of the jerk J is equal to or smaller than the jerk threshold Jth, the CPU makes a "Yes" determination at step 825, and proceeds to step 830. At step 830, the CPU transmits a deceleration instruction indicative of the target acceleration Gtgt to the engine ECU 30 and the brake ECU 40. As described, the start condition includes the condition that the vehicle speed Vs is higher than the target vehicle speed Vtgt. As described later, an end condition includes a condition that the vehicle speed Vs is equal to or lower than the target vehicle speed Vtgt. Therefore, the target acceleration Gtgt obtained at step 815 is negative (i.e., the target acceleration Gtgt is a value that causes the vehicle VA to decelerate).

When the engine ECU 30 receives the deceleration instruction, the engine ECU 30 controls the engine actuator 36 so as to make the acceleration G equal to "the target acceleration Gtgt indicated by the deceleration instruction". When the brake ECU 40 receives the deceleration instruction, the brake ECU 40 controls the brake actuator 44 so as to make the acceleration G equal to "the target acceleration Gtgt indicated by the deceleration instruction".

After the CPU executes the process of step 830, the CPU proceeds to step 895 to terminate the present routine tentatively.

Whereas, if the magnitude of the jerk J is greater than the jerk threshold Jth, the CPU makes a "No" determination at step 825, and proceeds to step 835.

At step 835, the CPU sets the target acceleration Gtgt to "a restriction acceleration Gtgt'" that causes the magnitude of the jerk J to become equal to the jerk threshold Jth.

When the jerk J is equal to or larger than "0" (namely, when the target acceleration Gtgt is equal to or larger than the acceleration G), the CPU obtains the restriction acceleration Gtgt' using the following equation (2).

$$Gtgt' = G + Jth \quad (2)$$

When the jerk J is smaller than "0" (namely, when the target acceleration Gtgt is smaller than the acceleration G), the CPU obtains the restriction acceleration Gtgt' using the following equation (3).

$$Gtgt'=G-Jth \quad (3)$$

After the CPU executes the process of step 835, the CPU proceeds to step 830 to transmit the deceleration instruction to the engine ECU 30 and the brake ECU 40. Thereafter, the CPU proceeds to step 895 to terminate the present routine tentatively.

<End Condition Determining Routine>

Figure 9:
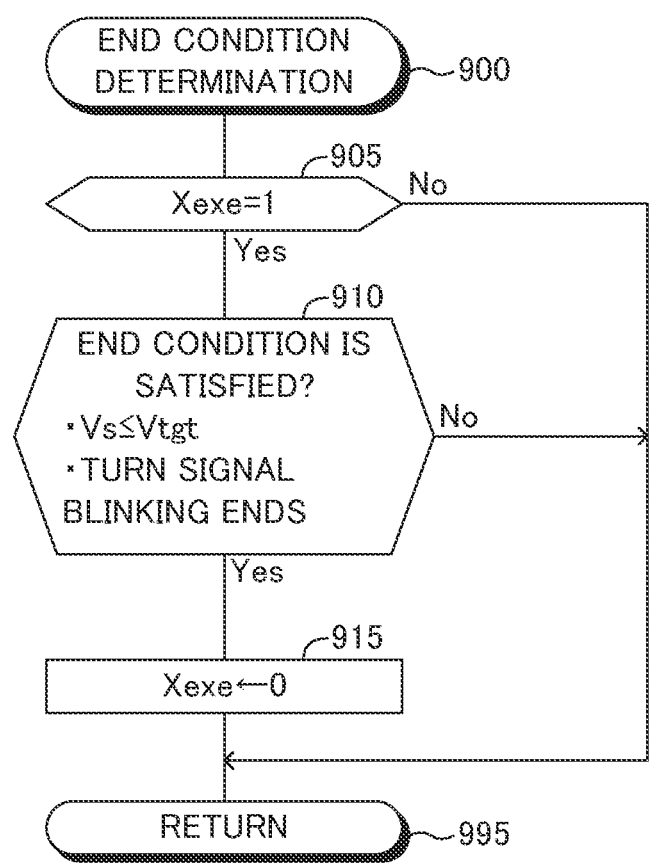
FIG. 9 is a flowchart illustrating an end condition determining routine executed by the CPU of the driving assistance ECU shown in FIG. 1.

The CPU is configured or programmed to execute an end condition determining routine shown by a flowchart in FIG. 9 every time a predetermined time elapses.

When an appropriate time point comes, the CPU starts processing from step 900 shown in FIG. 9, and proceeds to step 905. At step 905, the CPU determines whether or not the value of the execution flag Xexe is "1".

When the value of the execution flag Xexe is "0", the CPU makes a "No" determination at step 905, and proceeds to step 995 to terminate the present routine tentatively.

Whereas, when the value of the execution flag Xexe is "1", the CPU makes a "Yes" determination at step 905, and proceeds to step 910. At step 910, the CPU determines whether or not the end condition becomes satisfied.

More specifically, the CPU determines that the end condition becomes satisfied, when at least one of the following condition EA and the following condition EB becomes satisfied.

Condition EA: the vehicle speed Vs becomes equal to or lower than the target vehicle speed Vtgt.

Condition EB: one of the right turn signal 26 and the left turn signal 27, that has being operating (blinking) finishes its operation (stops operating).

When the end condition is not satisfied (i.e., when any one of the conditions EA and EB is not satisfied), the CPU makes a "No" determination at step 910, and proceeds to step 995 to terminate the present routine tentatively.

Whereas, when the end condition is satisfied (i.e., when at least one of the conditions EA and EB is satisfied), the CPU makes a "Yes" determination at step 910, and proceeds to step 915. At step 915, the CPU sets the value of the execution flag Xexe to "0". Thereafter, the CPU proceeds to step 995 to terminate the present routine tentatively.

As described above, the present assistance apparatus 10 makes "the necessity degree α used when the left-or-right-turn-condition is not satisfied" be smaller than the necessity degree α used when the left-or-right-turn-condition is satisfied. Thus, the present assistance apparatus 10 performs the deceleration control using the target acceleration Gtgt having a relatively small magnitude, when the left-or-right-turn-condition is not satisfied.

Accordingly, the present assistance apparatus 10 is capable of:
- increasing a possibility that the uneasiness that the passenger of the vehicle feels when the decelerating control is erroneously performed is mitigated; and
- increasing a possibility that the vehicle is sufficiently decelerated when the decelerating control is properly/appropriately performed.

In addition, when the left-or-right-turn-condition is not satisfied, the present assistance apparatus 10 sets the necessity degree α to the value that corresponds to the current surrounding condition of the vehicle VA by referring to the necessity degree information. This can cause the necessity degree α to be appropriate for the current surrounding condition of the vehicle VA. Therefore, the present assistance apparatus 10 can further increase the above-described possibility that the uneasiness is mitigated, and the above-described possibility that the vehicle is sufficiently decelerated.

The present disclosure should not be limited to the above-described embodiment, and may employ various modifications within the scope of the present disclosure.

(First Modification)

Individual necessity degree information in place of the necessity degree information has been stored in the necessity degree information storage section 28a of the storage device 28 that the present assistance apparatus 10 according to a first modification includes. As shown in FIG. 10, a plurality of conditions and addition-and-subtraction-values corresponding to the conditions have been recorded/stored for each of the surrounding parameters Ps in/as the individual necessity degree information.

The individual necessity degree information will next be described for each of the surrounding parameters Ps.

<Road Shoulder Distance Dr>

When the road shoulder distance Dr is equal to or longer than the road shoulder distance threshold Drth, the addition-and-subtraction-value is "+0.3", and therefore, the necessity degree α is incremented by "0.3".

When the road shoulder distance Dr is shorter than the road shoulder distance threshold Drth, the addition-and-subtraction-value is "+0.5", and therefore, the necessity degree α is incremented by "0.5".

<Adjacent Vehicle Speed Vb>

When the adjacent vehicle speed Vb is equal to or higher than the adjacent vehicle speed threshold Vbth, the addition-and-subtraction-value is "−0.1", and therefore, the necessity degree α is decremented by "0.1".

When the adjacent vehicle speed Vb is "0", the addition-and-subtraction-value is "+0.5", and therefore, the necessity degree α is incremented by "0.5".

When the adjacent vehicle speed Vb is lower than the adjacent vehicle speed threshold Vbth, the addition-and-subtraction-value is "+0.1", and therefore, the necessity degree α is incremented by "0.1".

When the adjacent vehicle VB is not present, the addition-and-subtraction-value is "0", and therefore, the necessity degree α is neither incremented nor decremented.

<Adjacent Vehicle Acceleration Gb>

When the adjacent vehicle acceleration Gb is negative, the addition-and-subtraction-value is "+0.5", and therefore, the necessity degree α is incremented by "0.5".

When the adjacent vehicle acceleration Gb is greater than a predetermined adjacent vehicle acceleration Gbth, the addition-and-subtraction-value is "−0.2", and therefore, the necessity degree α is decremented by "0.2". The adjacent vehicle acceleration Gbth has been set at a predetermined positive value.

When the adjacent vehicle acceleration Gb is equal to or greater than "0" and is equal to or smaller than the adjacent vehicle acceleration Gbth, the addition-and-subtraction-value is "−0.1", and therefore, the necessity degree α is decremented by "0.1".

When the adjacent vehicle VB is not present, the addition-and-subtraction-value is "0", and therefore, the necessity degree α is neither incremented nor decremented.

<Preceding Vehicle Acceleration Gc>

When the preceding vehicle acceleration Gc is equal to or greater than "0", the addition-and-subtraction-value is "−0.3", and therefore, the necessity degree α is decremented by "0.3".

When the preceding vehicle acceleration Gc is negative, the addition-and-subtraction-value is "+0.2", and therefore, the necessity degree α is incremented by "0.2".

When the preceding vehicle VC is not present, the addition-and-subtraction-value is "0", and therefore, the necessity degree α is neither incremented nor decremented.

When the CPU of the DSECU 20 according to the present modification proceeds to step 710 shown in FIG. 7, the CPU obtains the addition-and-subtraction-value by applying each of the surrounding parameters Ps to the individual necessity degree information, and calculates/obtains the necessity degree α using the addition-and-subtraction-value. It should be noted that the necessity degree α is set to "0.5" when the start condition becomes satisfied.

In this manner, the necessity degree α in accordance with the current surrounding condition of the vehicle VA is obtained.

(Second Modification)

The present assistance apparatus 10 according to a second modification is configured to determine that the left-or-right-turn-condition is satisfied as long as the main light ML indicates the green light B and the predicted movement direction coincides with the permitted lane direction, even when the arrow light AL does not indicate the arrow signal or the arrow light AL is not detected.

Figure 11:
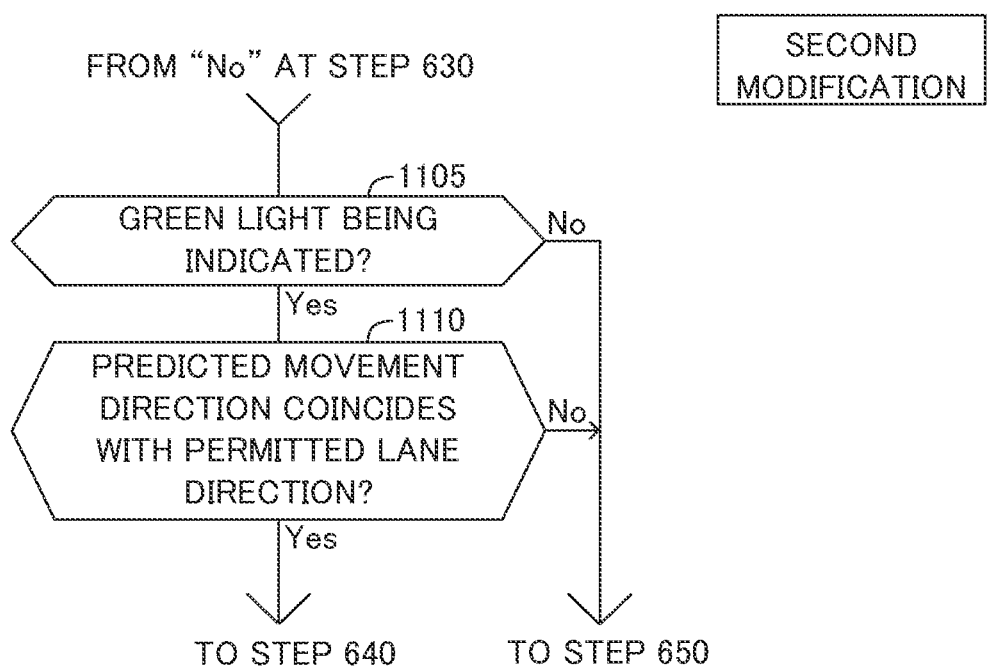
FIG. 11 is a flowchart illustrating a start condition determining routine used in a second modification of the embodiment according to the present disclosure.

When the CPU of the DSECU 20 according to the second modification proceeds to step 630 shown in FIG. 6, the CPU makes a "No" determination at step 630 if the arrow light AL does not indicate the arrow signal or the arrow light AL is not detected, and proceeds to step 1105 shown in FIG. 11. At step 1105, the CPU determines whether or not the main light ML is indicating the green light B.

When the main light ML is indicating the green light B, the CPU makes a "Yes" determination at step 1105, and proceeds to step 1110. At step 1110, the CPU determines whether or not the predicted movement direction coincides with the permitted lane direction.

When the predicted movement direction coincides with the permitted lane direction, the CPU determines that the left-or-right-turn-condition is satisfied. In this case, the makes a "Yes" determination at step 1110, and proceeds to step 640 shown in FIG. 6.

Whereas, if the predicted movement direction does not coincide with the permitted lane direction, the CPU determines that the left-or-right-turn-condition is not satisfied. In this case, the makes a "No" determination at step 1110, and proceeds to step 650 shown in FIG. 6.

Whereas, if the main light ML is not indicating the green light B when the CPU proceeds to step 1105, the CPU determines that the left-or-right-turn-condition is not satisfied. In this case, the makes a "No" determination at step 1105, and proceeds to step 650 shown in FIG. 6.

(Third Modification)

The present assistance apparatus 10 according to a third modification is configured to determine that the left-or-right-turn-condition is satisfied as long as the arrow light AL indicates the arrow signal and the predicted movement direction coincides with the direction of the arrow of the indicated arrow signal, even when the arrow road sign AM is not detected.

Figure 12:
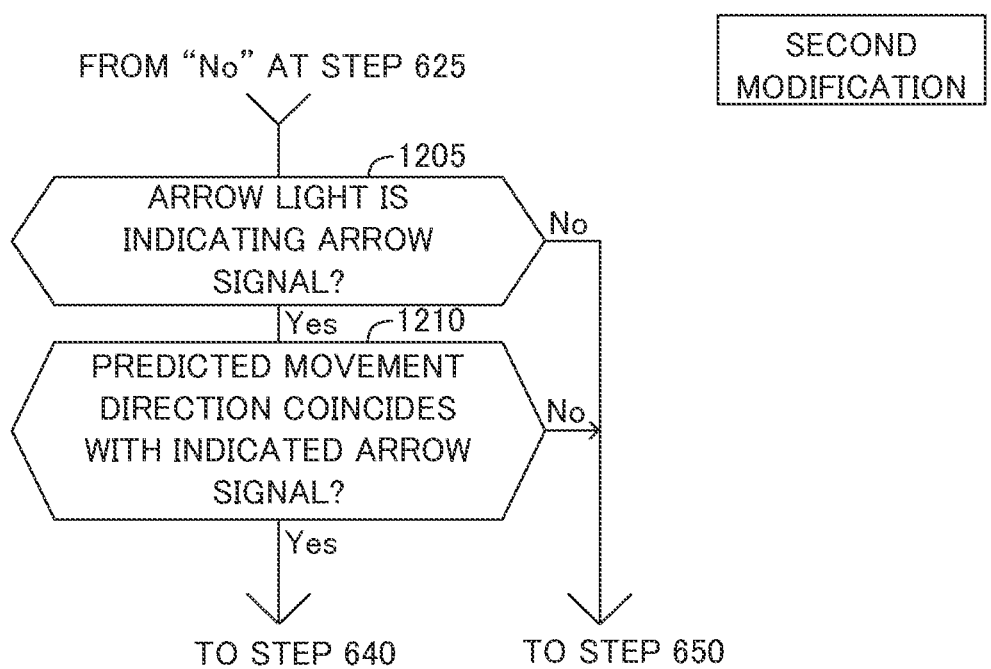
FIG. 12 is a flowchart illustrating a start condition determining routine used in a third modification of the embodiment according to the present disclosure.
Figure 13:
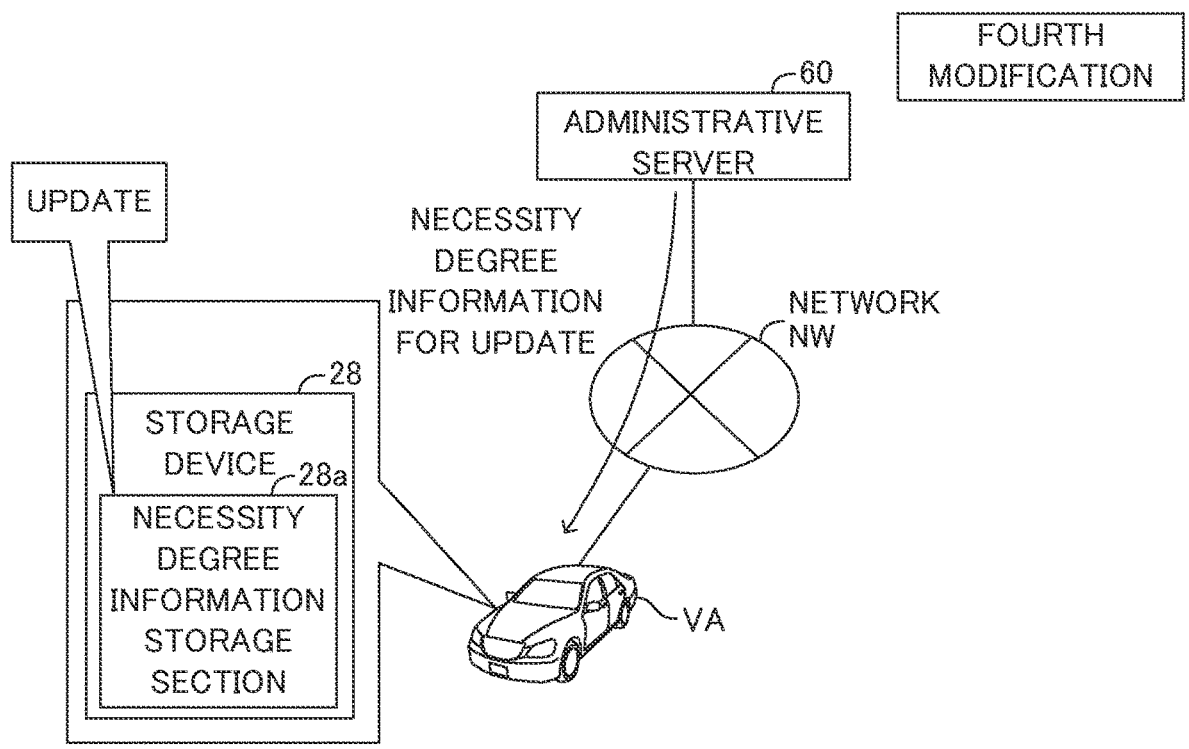
FIG. 13 is a schematic system diagram of a fourth modification of the embodiment according to the present disclosure.

When the CPU of the DSECU 20 according to the third modification proceeds to step 625 shown in FIG. 6, the CPU makes a "No" determination at step 625 if the arrow road sign AM is not detected, and proceeds to step 1205 shown in FIG. 12. At step 1205, the CPU determines whether or not the arrow light AL is indicating the arrow signal.

When the arrow light AL is indicating the arrow signal, the CPU makes a "Yes" determination at step 1205, and proceeds to step 1210. At step 1210, the CPU determines whether or not the predicted movement direction coincides with the direction of the arrow of the indicated arrow signal.

When the predicted movement direction coincides with the direction of the arrow of the indicated arrow signal, the CPU determines that the left-or-right-turn-condition is satisfied. In this case, the makes a "Yes" determination at step 1210, and proceeds to step 640 shown in FIG. 6.

Whereas, if the predicted movement direction does not coincide with the direction of the arrow of the indicated arrow signal, the CPU determines that the left-or-right-turn-condition is not satisfied. In this case, the makes a "No" determination at step 1210, and proceeds to step 650 shown in FIG. 6.

Whereas, if the arrow light AL is not indicating the arrow signal or if the arrow light AL is not detected when the CPU proceeds to step 1205, the CPU determines that the left-or-right-turn-condition is not satisfied. In this case, the makes a "No" determination at step 1205, and proceeds to step 650 shown in FIG. 6.

According to the second modification and the third modification, it is determined that the left-or-right-turn-condition is satisfied, when the predicted movement direction coincides with the direction of the arrow of the indicated arrow signal or the permitted lane direction. In other words, the left-or-right-turn-condition may be defined as a condition that is satisfied when the vehicle VA is permitted to move to/toward the predicted movement direction.

(Fourth Modification)

In a fourth modification, the vehicle VA is connected to an administrative server 60 through a network NW in such a manner that the vehicle VA can exchange data with the server 60.

The administrative server 60 produces necessity degree information for update in accordance with requests from a user of the driving assistance apparatus 10. For example, the necessity degree information for update is updated by the following operations:

addition of a new situation;
deletion of the stored/existing situation;
addition of a new surrounding parameter Ps;
deletion of the stored/existing surrounding parameter Ps;
addition of a new condition to be satisfied for the stored/existing situation;
deletion or change of the stored/existing condition to be satisfied for the stored/existing situation; and/or
change of the necessity degree α.

The administrative server 60 transmits the necessity degree information for update to the vehicle VA through the network NW. When the vehicle VA receives the necessity degree information for update, the driving assistance apparatus 10 updates the necessity degree information stored in the necessity degree information storage section 28a of the storage device 28, based on the received necessity degree information for update.

It should be noted that the fourth modification can be applied to the second modification. Namely, the administrative server 60 produces and transmits individual necessity degree information for update to the vehicle VA through the network NW. The driving assistance apparatus 10 updates the individual necessity degree information based on the received individual necessity degree information for update.

(Fifth Modification)

The necessity degree α is not limited to a value that is equal to or larger than "0" and is equal to or smaller than "1".

For example, the necessity degree α may assume one of a large value, a middle value, and a small value (here, the large value>the middle value>the small value>0)

For example, in the necessity degree information shown in FIG. 2, the necessity degree α corresponding to the situation 1 and the situation 3 may be the small value, the necessity degree α corresponding to the situation 2 may be the large value, and the necessity degree α that does not correspond to any of the situations 1-3 may be the middle value.

The driving assistance apparatus 10 may set the necessity degree α used in the equation (1) as follows.

The necessity degree α is set to "0.8" as the large value.
The necessity degree α is set to "0.5" as the middle value.
The necessity degree α is set to "0.2" as the small value.

(Sixth Modification)

The DSECU 20 in the above-described embodiment specifies/determines the predicted movement direction based on the operation to the turn signal lever 25. Whereas, the DSECU 20 according to a sixth modification specifies/determines the predicted movement direction based on the operation to the steering wheel SW. More specifically, the DSECU 20 of the sixth modification specifies/detects an operating direction of the steering wheel SW based on the detected signal from the steering angle sensor 52, and specifies/determines the predicted movement direction based on the specified operating direction of the steering wheel SW.

It should be noted that the turn signal lever 25 and the steering wheel SW may be referred to as "an operating element".

(Seventh Modification)

The DSECU 20 of the driving assistance apparatus 10 according to a seventh modification may vary the target vehicle speed Vtgt used in the equation (1) depending on a size of the intersection. More specifically, the DSECU 20 of the seventh modification makes the target vehicle speed Vtgt smaller as the size of the intersection is larger. For example, the DSECU 20 specifies/obtains the number of the lanes that the traveling lane intersects in the intersection, and determines that the size of the intersection is larger as the number of the lanes that the traveling lane intersects is greater.

(Eighth Modification)

The millimeter wave radar device 23 may be replaced with a remote sensing device configured to transmit a radio wave instead of the millimeter wave and receive a reflected radio wave so as to detect an object. In addition, if the position of the object can be accurately detected/specified only by the camera device 22, the driving assistance apparatus 10 does not have to include the millimeter wave radar device 23.

(Ninth Modification)

The present assistance apparatus 10 can be applied not only to the above-described the vehicle with the internal combustion engine, but also to one of a Hybrid Electric Vehicle (HEV), a Plug-in Hybrid Electric Vehicle (PHEV), a Fuel Cell Electric Vehicle (FCEV), and a Battery Electric Vehicle (BEV).

The present disclosure may be viewed as a machine readable and nonvolatile storage medium storing programs that realize the functions of the above-described driving assistance apparatus 10.

The present disclosure may be applied to an autonomous driving vehicle.

What is claimed is:

1. A driving assistance apparatus for assisting driving of a driver of a vehicle by performing a deceleration control to decelerate said vehicle when said vehicle makes a right turn or a left turn at an intersection,
wherein,
said driving assistance apparatus is configured to make a magnitude of a deceleration of said vehicle while performing said deceleration control of when a left-or-right-turn-condition is not satisfied smaller than a magnitude of a deceleration of said vehicle while performing said deceleration control of when said left-or-right-turn-condition is satisfied, in a case where a distance between said vehicle and said intersection is equal to or shorter than a distance threshold and said vehicle is predicted to change a moving direction to a particular direction, said left-or-right-turn-condition being a condition that is satisfied when said vehicle is permitted to change said moving direction to said particular direction in a traveling lane in which said vehicle is running,
wherein said driving assistance apparatus is configured to:
obtain a necessity degree for performing said deceleration control based on a surrounding condition of said vehicle, when said left-or-right-turn-condition is not satisfied; and
perform said deceleration control in such a manner that said magnitude of said deceleration is smaller as said necessity degree is smaller.

2. The driving assistance apparatus according to claim 1, wherein said driving assistance apparatus is configured to:
have stored necessity degree information that defines a relationship between said necessity degree corresponding to a specific situation and at least one surrounding parameter representing said specific situation in advance;
obtain a current surrounding parameter when said left-or-right-turn-condition is not satisfied; and
obtain said necessity degree by applying said current surrounding parameter to said necessity degree information.

3. The driving assistance apparatus according to claim 1, wherein said driving assistance apparatus is configured to:
have stored individual necessity degree information that defines a relationship between an individual condition for each of a plurality of surrounding parameters representing said surrounding condition of said vehicle and an addition-and-subtraction-value for a case where said surrounding parameter satisfies said individual condition, in advance;
obtain current surrounding parameters when said left-or-right-turn-condition is not satisfied;
obtain said addition-and-subtraction-value by applying said current surrounding parameters to said individual necessity degree information; and
obtain said necessity degree based on said addition-and-subtraction-value.

4. The driving assistance apparatus according to claim 2, wherein said driving assistance apparatus is configured to:
be connected with an administrative server through a network; and
update said necessity degree information based on necessity degree information for update produced by said administrative server, when said necessity degree information for update is received.

5. The driving assistance apparatus according to claim 1, wherein said driving assistance apparatus is configured to:
include an operating element that is operated by said driver of said vehicle when said driver intends to change said moving direction of said vehicle; and specify said particular direction to which said vehicle is predicted to change said moving direction, based on an operation of said driver to said operating element.

6. The driving assistance apparatus according to claim 1, wherein said driving assistance apparatus is configured to determine whether or not said left-or-right-turn-condition is satisfied by determining whether or not said vehicle is permitted to change said moving direction to said particular direction in said traveling lane, based on at least one of an image of a traffic light and an image of an arrow road sign in said traveling lane, said image of said traffic light and said image of said arrow road sign being included in a camera image which a camera device mounted on said vehicle obtains by taking a picture of an area in front of said vehicle.

7. A driving assistance method for assisting driving of a driver of a vehicle by performing a deceleration control to decelerate said vehicle when said vehicle makes a right turn or a left turn at an intersection, comprising:
- a first step for determining a magnitude of a target deceleration of said vehicle while performing said deceleration control so as to make a magnitude of said target deceleration of said vehicle while performing said deceleration control of when a left-or-right-turn-condition is not satisfied smaller than a magnitude of said target deceleration of said vehicle while performing said deceleration control of when said left-or-right-turn-condition is satisfied, in a case where a distance between said vehicle and said intersection is equal to or shorter than a distance threshold and said vehicle is predicted to change a moving direction to a particular direction, said left-or-right-turn-condition being a condition that is satisfied when said vehicle is permitted to change said moving direction to said particular direction in a traveling lane in which said vehicle is running; and
- a second step for performing said deceleration control using said target deceleration, wherein said driving assistance method includes:
- obtaining a necessity degree for performing said deceleration control based on a surrounding condition of said vehicle, when said left-or-right-turn-condition is not satisfied; and
- performing said deceleration control in such a manner that said magnitude of said deceleration is smaller as said necessity degree is smaller.

8. A non-transitory computer readable medium, storing a program for assisting driving of a driver of a vehicle by performing a deceleration control to decelerate said vehicle when said vehicle makes a right turn or a left turn at an intersection,
said program causing a processor to implement processes of:
- a first step for determining a magnitude of a target deceleration of said vehicle while performing said deceleration control so as to make a magnitude of said target deceleration of said vehicle while performing said deceleration control of when a left-or-right-turn-condition is not satisfied smaller than a magnitude of said target deceleration of said vehicle while performing said deceleration control of when said left-or-right-turn-condition is satisfied, in a case where a distance between said vehicle and said intersection is equal to or shorter than a distance threshold and said vehicle is predicted to change a moving direction to a particular direction, said left-or-right-turn-condition being a condition that is satisfied when said vehicle is permitted to change said moving direction to said particular direction in a traveling lane in which said vehicle is running; and
- a second step for performing said deceleration control using said target deceleration,
wherein said program further causes a processor to implement processes of:
- obtaining a necessity degree for performing said deceleration control based on a surrounding condition of said vehicle, when said left-or-right-turn-condition is not satisfied; and
- performing said deceleration control in such a manner that said magnitude of said deceleration is smaller as said necessity degree is smaller.

* * * * *